(12) United States Patent
Liang et al.

(10) Patent No.: US 12,003,885 B2
(45) Date of Patent: Jun. 4, 2024

(54) VIDEO FRAME INTERPOLATION VIA FEATURE PYRAMID FLOWS

(71) Applicant: Microsoft Technology Licensing, LLC, Redmond, WA (US)

(72) Inventors: Luming Liang, Redmond, WA (US); Tianyu Ding, Baltimore, MD (US); Ilya Dmitriyevich Zharkov, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 279 days.

(21) Appl. No.: 17/347,481

(22) Filed: Jun. 14, 2021

(65) Prior Publication Data
US 2022/0400226 A1    Dec. 15, 2022

(51) Int. Cl.
*G06T 3/4007* (2024.01)
*G06N 3/045* (2023.01)
(Continued)

(52) U.S. Cl.
CPC ............. *H04N 7/014* (2013.01); *G06N 3/045* (2023.01); *G06T 3/4007* (2013.01);
(Continued)

(58) Field of Classification Search
CPC .......... G06N 3/045; G06N 3/08; G06N 20/10; G06N 3/04; G06N 20/00; G06N 3/02; G06T 2207/20084; G06T 2207/10016; G06T 2207/20081; G06T 3/0093; G06T 3/4007; G06T 2207/20016; G06T 3/4046;
(Continued)

(56) References Cited

U.S. PATENT DOCUMENTS 10,776,688 B2 *   9/2020   Jiang ..................... G06N 3/045
2018/0063551 A1 * 3/2018   Adsumilli ............ H04N 19/137
(Continued)

FOREIGN PATENT DOCUMENTS

WO   WO-2021093432 A1 *   5/2021   ........... G06N 3/0454

OTHER PUBLICATIONS

Shi, et al., "Video Interpolation via Generalized Deformable Convolution", In Repository of arXiv:2008.10680v1, Aug. 24, 2020, 11 Pages.
(Continued)

*Primary Examiner* — Ian L Lemieux
*Assistant Examiner* — Woo C Rhim

(57) ABSTRACT

Systems and methods for generating interpolated images are disclosed. In examples, image features are extracted from a first image and a second image; such image features may be warped using first and second plurality of parameters. A first candidate intermediate frame may be generated based on the warped first features and the warped second features. Multi-scale features associated with the image features extracted from the first image and the second image may be obtained and warped using the first and second plurality of parameters. A second candidate intermediate frame may be generated based on the warped first multi-scale features and the warped second multi-scale features. By blending the first candidate intermedia frame with the second candidate intermediate frame, an interpolated image may be generated.

18 Claims, 14 Drawing Sheets

(51) Int. Cl.
G06V 10/46 (2022.01)
H04N 7/01 (2006.01)
H04N 19/587 (2014.01)

(52) U.S. Cl.
CPC ......... *G06V 10/462* (2022.01); *H04N 7/0127* (2013.01); *H04N 7/0145* (2013.01); *H04N 19/587* (2014.11)

(58) Field of Classification Search
CPC ........ G06T 2207/20221; H04N 19/587; H04N 19/172; H04N 7/0135; H04N 19/132; H04N 19/59; H04N 7/014; H04N 7/0127; H04N 7/0145; G06V 10/82; G06V 20/40; G06V 20/46; G06V 10/7715; G06V 10/806; G06V 10/462
See application file for complete search history.

(56) References Cited

U.S. PATENT DOCUMENTS

| | | | |
|---|---|---|---|
| 2019/0138889 A1* | 5/2019 | Jiang | G06N 3/045 |
| 2019/0289321 A1* | 9/2019 | Liu | H04N 19/587 |
| 2020/0012940 A1* | 1/2020 | Liu | H04N 7/0135 |
| 2020/0160546 A1* | 5/2020 | Gu | G06N 3/08 |
| 2020/0302582 A1* | 9/2020 | Smirnov | H04N 23/741 |
| 2020/0356827 A1* | 11/2020 | Dinerstein | G06F 18/213 |
| 2020/0394752 A1* | 12/2020 | Liu | G06T 3/4007 |
| 2021/0067735 A1* | 3/2021 | Reda | G06N 3/045 |
| 2021/0279840 A1* | 9/2021 | Chi | G06T 3/40 |
| 2021/0368131 A1* | 11/2021 | Wen | H04N 7/0137 |
| 2021/0383169 A1* | 12/2021 | Wang | G06F 18/217 |
| 2022/0038654 A1* | 2/2022 | Reda | H04N 7/014 |
| 2022/0092795 A1* | 3/2022 | Liu | G06T 3/4007 |
| 2022/0400226 A1* | 12/2022 | Liang | H04N 19/59 |
| 2023/0007240 A1* | 1/2023 | Li | H04N 19/105 |
| 2023/0077379 A1* | 3/2023 | Schroers | H04N 19/537 |
| 2023/0344962 A1* | 10/2023 | Tran | G06N 5/04 |

OTHER PUBLICATIONS

Simonyan, et al., "Very Deep Convolutional Networks for Large-Scale Image Recognition", In Repository of arXiv:1409.1556v1, Sep. 4, 2014, 10 Pages.

Son, et al., "AIM 2020 Challenge on Video Temporal Super-Resolution", In Repository of arXiv:2009.12987v1, Sep. 28, 2020, 18 Pages.

Soomro, et al., "UCF101: A Dataset of 101 Human Actions Classes from Videos in The Wild", In Repository of arXiv:1212.0402v1, Dec. 3, 2012, 7 Pages.

Sun, et al., "PWC-Net: CNNs for Optical Flow Using Pyramid, Warping, and Cost Volume", In Proceedings of the IEEE/CVF Conference on Computer Vision and Pattern Recognition, Jun. 18, 2018, pp. 8934-8943.

Ullrich, et al., "Soft Weight-Sharing for Neural Network Compression", In Repository of arXiv:1702.04008v1, Feb. 13, 2017, 16 Pages.

Wang, et al., "Image Quality Assessment: From Error Visibility to Structural Similarity", In IEEE Transactions on Image Processing, vol. 13, Issue 4, Apr. 13, 2004, pp. 600-612.

Weinzaepfel, et al., "DeepFlow: Large Displacement Optical Flow with Deep Matching", In Proceedings of the IEEE International Conference on Computer Vision, Dec. 1, 2013, pp. 1385-1392.

Wen, et al., "Learning Structured Sparsity in Deep Neural Networks", In Proceedings of the 30th Conference on Neural Information Processing Systems, Dec. 5, 2016, 9 Pages.

Werlberger, et al., "Optical Flow Guided TV-L1 Video Interpolation and Restoration", In Proceedings of International Workshop on Energy Minimization Methods in Computer Vision and Pattern Recognition, Jul. 25, 2011, 14 Pages.

Xu, et al., "Quadratic Video Interpolation", In Proceedings of 33rd Conference on Neural Information Processing Systems, Dec. 8, 2019, 10 Pages.

Xue, et al., "Video Enhancement with Task-Oriented Flow", In International Journal of Computer Vision, vol. 127, Issue 8, Feb. 12, 2019, 20 Pages.

Yuan, et al., "Zoom-In-to-Check: Boosting Video Interpolation via Instance-level Discrimination", In Proceedings of the IEEE/CVF Conference on Computer Vision and Pattern Recognition, Jun. 16, 2019, pp. 12183-12191.

Zhang, et al., "The Unreasonable Effectiveness of Deep Features as a Perceptual Metric", In Proceedings of the IEEE/CVF Conference on Computer Vision and Pattern Recognition, Jun. 18, 2018, pp. 586-595.

Zhou, et al., "Less is More: Towards Compact CNNs", In Proceedings of 14th European Conference on Computer Vision, Oct. 11, 2016, 16 Pages.

Zhou, et al., "View Synthesis by Appearance Flow", In Proceedings of 14th European Conference on Computer Vision, Oct. 11, 2016, 16 Pages.

Zhu, et al., "Deformable ConvNets v2: More Deformable, Better Results", In Proceedings of the IEEE/CVF Conference on Computer Vision and Pattern Recognition, Jun. 16, 2019, pp. 9308-9316.

Zhu, et al., "To Prune, or not to Prune: Exploring the Efficacy of Pruning for Model Compression", In Repository of arXiv:1710.01878v1, Oct. 5, 2017, 11 Pages.

Baker, et al., "A Database and Evaluation Methodology for Optical Flow", In International Journal of Computer Vision, vol. 92, Issue 1, Mar. 1, 2011, 31 Pages.

Bao, et al., "Depth-Aware Video Frame Interpolation", In Proceedings of the IEEE/CVF Conference on Computer Vision and Pattern Recognition, Jun. 16, 2019, pp. 3703-3712.

Bao, et al., "High-Order Model and Dynamic Filtering for Frame Rate Up-Conversion", In Journal of IEEE Transactions on Image Processing, vol. 27, Issue 8, Aug. 2018, pp. 3813-3826.

Bao, et al., "MEMC-Net: Motion Estimation and Motion Compensation Driven Neural Network for Video Interpolation and Enhancement", In IEEE Transactions on Pattern Analysis and Machine Intelligence, Sep. 17, 2019, 16 Pages.

Bucila, et al., "Model Compression", In Proceedings of the 12th ACM SIGKDD International Conference on Knowledge Discovery and Data Mining, Aug. 20, 2006, pp. 535-541.

Chen, Tianyi, "A Fast Reduced-Space Algorithmic Framework for Sparse Optimization", In Dissertation Submitted to Johns Hopkins University in Conformity with the requirements for the Degree of Doctor of Philosophy, Aug. 2018, 195 Pages.

Chen, et al., "Compressing Neural Networks with the Hashing Trick", In Proceedings of the 32nd International Conference on Machine Learning, Jul. 6, 2015, 10 Pages.

Chen, et al., "Half-Space Proximal Stochastic Gradient Method for Group-Sparsity Regularized Problem", In Repository of arXiv:2009.12078v1, Sep. 25, 2020, 11 Pages.

Chen, et al., "Neural Network Compression Via Sparse Optimization", In Repository of arXiv:2011.04868v1, Nov. 10, 2020, 9 Pages.

Chen, et al., "Orthant Based Proximal Stochastic Gradient Method for {1-Regularized Optimization", In Repository of arXiv:2004.03639v1, Apr. 7, 2020, 17 Pages.

Cheng, et al., "A Survey of Model Compression and Acceleration for Deep Neural Networks", In Repository of arXiv:1710.09282v9, Jun. 14, 2020, 10 Pages.

Cheng, et al., "Multiple Video Frame Interpolation via Enhanced Deformable Separable Convolution", In Repository of arXiv:2006.08070v1, Jun. 15, 2020, 17 Pages.

Cheng, et al., "Video Frame Interpolation via Deformable Separable Convolution", In Proceedings of the 34th AAAI Conference on Artificial Intelligence, vol. 34, Issue 07, Apr. 3, 2020, pp. 10607-10614.

Chi, et al., "All at Once: Temporally Adaptive Multi-Frame Interpolation with Advanced Motion Modeling", In Repository of arXiv:2007.11762v1, Jul. 23, 2020, 16 Pages.

(56) References Cited

OTHER PUBLICATIONS

Choi, et al., "Channel Attention is all you Need for Video Frame Interpolation", In Proceedings of the 34th AAAI Conference on Artificial Intelligence, vol. 34, Issue 7, Apr. 3, 2020, pp. 10663-10671.
Choi, et al., "Scene-Adaptive Video Frame Interpolation via Meta-Learning", In Proceedings of the IEEE/CVF Conference on Computer Vision and Pattern Recognition, Jun. 13, 2020, pp. 9444-9453.
Dai, et al., "Deformable Convolutional Networks", In Proceedings of IEEE International Conference on Computer Vision, Oct. 22, 2017, pp. 764-773.
Dosovitskiy, et al., "FlowNet: Learning Optical Flow with Convolutional Networks", In Proceedings of IEEE International Conference on Computer Vision, Dec. 7, 2015, pp. 2758-2766.
Dosovitskiy, et al., "Learning to Generate Chairs with Convolutional Neural Networks", In Proceedings of the IEEE Conference on Computer Vision and Pattern Recognition, Jun. 7, 2015, pp. 1538-1546.
Flynn, et al., "DeepStereo: Learning to Predict New Views from the World's Imagery", In Proceedings of the IEEE Conference on Computer Vision and Pattern Recognition, Jun. 27, 2016, pp. 5515-5524.
Fourure, et al., "Residual Conv-Deconv Grid Network for Semantic Segmentation", In Repository of arXiv:1707.07958v1, Jul. 25, 2017, 13 Pages.
Han, et al., "Deep Compression: Compressing Deep Neural Networks with Pruning, Trained Quantization and Huffman Coding", In Repository of arXiv:1510.00149v2, Oct. 27, 2015, 11 Pages.
Han, et al., "Learning both Weights and Connections for Efficient Neural Networks", In Proceedings of the 28th International Conference on Neural Information Processing Systems, vol. 1, Dec. 2015, 9 Pages.
He, et al., "AMC: AutoML for Model Compression and Acceleration on Mobile Devices", In Proceedings of the European Conference on Computer Vision, Sep. 8, 2018, 17 Pages.
Hinton, et al., "Distilling the Knowledge in a Neural Network", In Repository of arXiv:1503.02531v1, Mar. 9, 2015, 9 Pages.
Ilg, et al., "FlowNet 2.0: Evolution of Optical Flow Estimation with Deep Networks", In Proceedings of the IEEE Conference on Computer Vision and Pattern Recognition, Jul. 21, 2017, pp. 2462-2470.
Jiang, et al., "Super SloMo: High Quality Estimation of Multiple Intermediate Frames for Video Interpolation", In Proceedings of the IEEE/CVF Conference on Computer Vision and Pattern Recognition, Jun. 18, 2018, pp. 9000-9008.
Kalantari, et al., "Learning-Based View Synthesis for Light Field Cameras", In ACM Transactions on Graphics, vol. 35, Issue 6, Nov. 11, 2016, 10 Pages.
Kingma, et al., "ADAM: A Method for Stochastic Optimization", In Repository of arXiv:1412.6980v1, Dec. 22, 2014, 9 Pages.
Kulkarni, et al., "Deep Convolutional Inverse Graphics Network", In Proceedings of the 28th International Conference on Neural Information Processing Systems, Dec. 7, 2015, 9 Pages.
Lebedev, et al., "Fast ConvNets Using Group-Wise Brain Damage", In Proceedings of the IEEE Conference on Computer Vision and Pattern Recognition, Jun. 27, 2016, pp. 2554-2564.
Lee, et al., "AdaCoF: Adaptive Collaboration of Flows for Video Frame Interpolation", In Proceedings of the IEEE/CVF Conference on Computer Vision and Pattern Recognition, Jun. 13, 2020, pp. 5315-5324.
Li, et al., "Pruning Filters for Efficient ConvNets", In Repository of arXiv:1608.08710v1, Aug. 31, 2016, 9 Pages.
Liu, et al., "Deep Video Frame Interpolation Using Cyclic Frame Generation", In Proceedings of the 33rd AAAI Conference on Artificial Intelligence, vol. 33, Issue 1, Jul. 17, 2019, pp. 8794-8802.
Liu, et al., "Enhanced Quadratic Video Interpolation", In Repository of arXiv:2009.04642v1, Sep. 10, 2020, 16 Pages.
Liu, et al., "Video Frame Synthesis using Deep Voxel Flow", In Proceedings of the IEEE International Conference on Computer Vision, Oct. 22, 2017, pp. 4463-4471.
Long, et al., "Learning Image Matching by Simply Watching Video", In Proceedings of European Conference on Computer Vision, Oct. 8, 2016, pp. 434-450.
Mahajan, et al., "Moving Gradients: A Path-Based Method for Plausible Image Interpolation", In ACM Transactions on Graphics, vol. 28, Issue 3, Aug. 2009, 12 Pages.
Meyer, et al., "Phase-Based Frame Interpolation for Video", In Proceedings of the IEEE Conference on Computer Vision and Pattern Recognition, Jun. 7, 2015, pp. 1410-1418.
Meyer, et al., "PhaseNet for Video Frame Interpolation", In Proceedings of the IEEE Conference on Computer Vision and Pattern Recognition, Jun. 18, 2018, pp. 498-507.
Niklaus, et al., "Context-Aware Synthesis for Video Frame Interpolation", In Proceedings of the IEEE/CVF Conference on Computer Vision and Pattern Recognition, Jun. 18, 2018, pp. 1701-1710.
Niklaus, et al., "Softmax Splatting for Video Frame Interpolation", In Proceedings of the IEEE/CVF Conference on Computer Vision and Pattern Recognition, Jun. 13, 2020, pp. 5437-5446.
Niklaus, et al., "Video Frame Interpolation via Adaptive Convolution", In Proceedings of the IEEE Conference on Computer Vision and Pattern Recognition, Jul. 21, 2017, pp. 670-679.
Niklaus, et al., "Video Frame Interpolation via Adaptive Separable Convolution", In Proceedings of the IEEE International Conference on Computer Vision, Oct. 22, 2017, pp. 261-270.
Park, et al., "BMBC: Bilateral Motion Estimation with Bilateral Cost vol. for Video Interpolation", In Repository of arXiv:2007.12622v1, Jul. 17, 2020, 16 Pages.
Peleg, et al., "IM-Net for High Resolution Video Frame Interpolation", In Proceedings of the IEEE/CVF Conference on Computer Vision and Pattern Recognition, Jun. 16, 2019, pp. 2398-2407.
Perazzi, et al., "A Benchmark Dataset and Evaluation Methodology for Video Object Segmentation", In Proceedings of the IEEE Conference on Computer Vision and Pattern Recognition, Jun. 27, 2016, pp. 724-732.
Polino, et al., "Model Compression via Distillation and Quantization", In Repository of arXiv:1802.05668v1, Feb. 15, 2018, 21 Pages.
Raket, et al., "Motion Compensated Frame Interpolation with a Symmetric Optical Flow Constraint", In Proceedings of 8th International Symposium on Visual Computing, Jul. 16, 2012, 11 Pages.
Reda, et al., "Unsupervised Video Interpolation Using Cycle Consistency", In Proceedings of the IEEE/CVF International Conference on Computer Vision, Oct. 27, 2019, pp. 892-900.
Ding, et al., "CDFI: Compression-driven Network Design for Frame Interpolation", In Repository of arXiv:2103.10559v2, Mar. 28, 2021, 11 Pages.
"International Search Report and Written Opinion Issued in PCT Application No. PCT/US22/028664", dated Sep. 22, 2022, 12 Pages.
Singh, et al., "A Comprehensive Survey on Video Frame Interpolation Techniques", The Journal of Visual Computer, vol. 38, Issue 1, Jan. 4, 2021, pp. 295-319.

\* cited by examiner

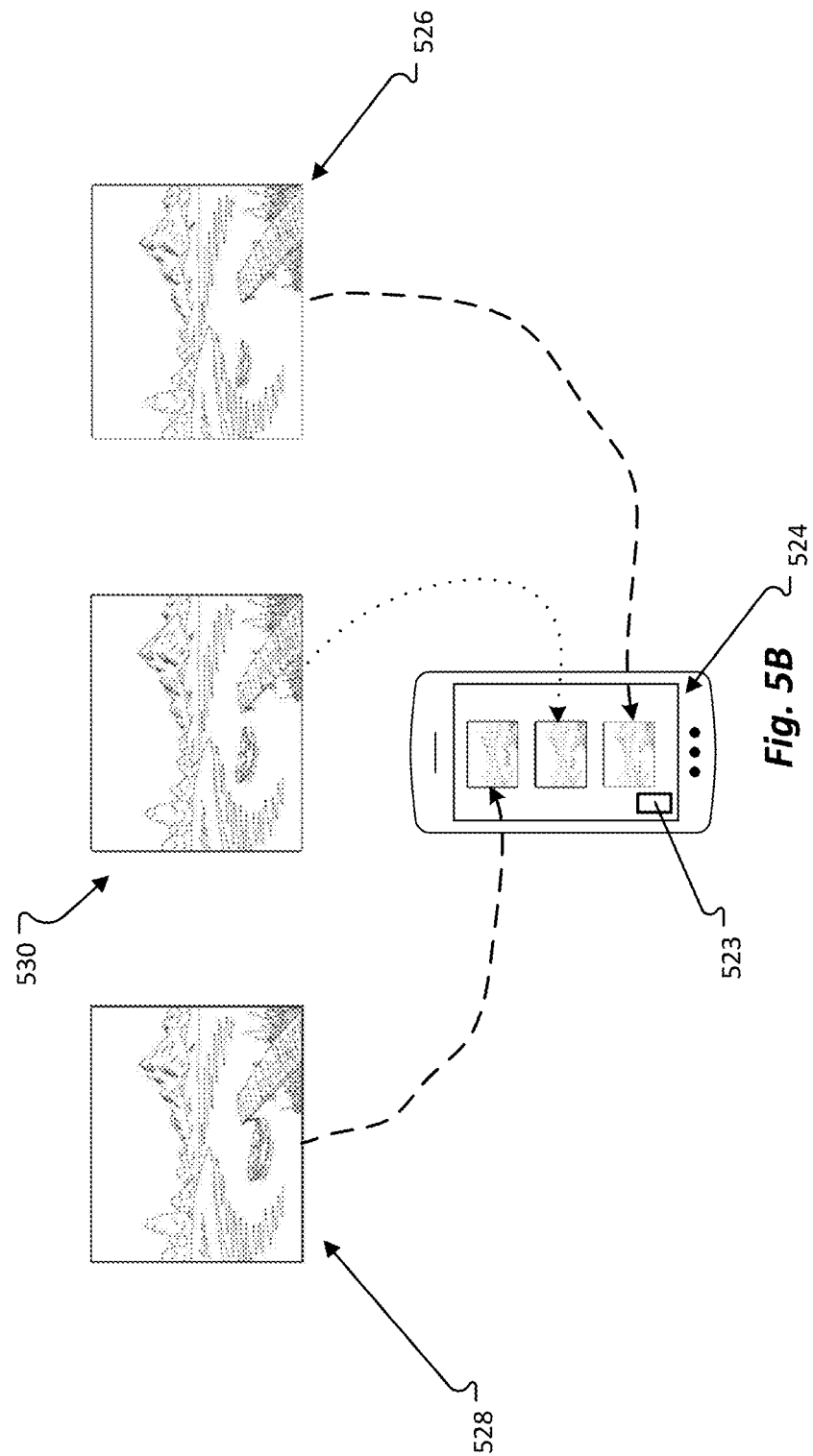

VIDEO FRAME INTERPOLATION VIA FEATURE PYRAMID FLOWS

BACKGROUND

Video frame interpolation is a lower-level computer vision task referring to the generation of intermediate or nonexistent frames between existing frames in a video frame sequence. The generation of the intermediate frames increases the temporal resolution of the video frame sequence and often plays an important role in many applications. However, a fundamental problem encountered when doing video frame interpolation involves estimations and predictions related to complex motion, occlusion, and feature variation that occurs in the real world.

Deep neural networks (DNN) have been studied for their promising results in motion estimation, occlusion reasoning, and image synthesis. In particular, due to the rapid expansion in optical flow techniques, many DNN approaches either utilize an off-the-shelf flow model or estimate their own task-specific flow as a guidance of pixel-level motion interpolation. However, integrating a pre-trained flow model tends to be contextually irrelevant and generally makes the DNN architecture inefficient at performing the required video interpolation tasks. Further, using only pixel-level information, task-orientated flows implemented by many optical flow techniques remain inefficient in handling complex occlusion and blur and may suffer from high computational costs.

There is a growing tendency to use more and more complicated and heavy DNN-based models that are designed for interpolating video frames. Most of these complicated and heavy DNN-based models involve performing training and inference on models consisting of over 20 million parameters. For example, the hybrid MEMC-Net model consists of more than 70 million parameters and requires around 280 megabytes if stored in 32-bit floating point. Normally, large models are difficult to train and inefficient during inference. Moreover, such models are not likely to be deployed on mobile devices, which restricts their use and generally prevents them from being widely adopted.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In accordance with examples of the present disclosure, a compression-driven network for performing video interpolation is described. The compression-driven network utilizes a multi-resolution warping module via a feature pyramid representation of the input frames to assist with the image synthesis.

In accordance with at least one example of the present disclosure, a convolutional neural network is described. The convolutional neural network may be configured to generate an interpolated image based on a first image and a second image, the convolutional neural network including: a first network including an encoder and a decoder, the first network configured to: extract first features from the first image, and extract second features from the second image; a feature pyramid configured to: extract multi-scale features from encoded first features, and extract multi-scale features from encoded second features; and a synthesis network configured to: warp the first features from the first image using a first plurality of parameters, warp the multi-scale features extracted from the encoded first features using the first plurality of parameters, warp the second features from the second image using a second plurality of parameters, warp the multi-scale features extracted from the encoded second features using the second plurality of parameters, generate a first candidate intermediate frame based on the warped first features and the warped second features, generate a second candidate intermediate frame based on the warped multi-scale features extracted from the encoded first features and the warped multi-scale features extracted from the encoded first features, and blend the first candidate intermediate frame and the second candidate intermediate frame to generate an interpolated frame.

In accordance with at least one example of the present disclosure, a method of generating an interpolated image is described. The method may include: receiving a first image and a second image at a neural network; extracting image features from the first image and warping the image features from the first image using a first plurality of parameters; extracting image features from the second image and warping the image features from the second image using a second plurality of parameters; generating a first candidate intermediate frame based on the warped first features and the warped second features; obtaining first multi-scale features associated with the image features extracted from the first image and warping the first multi-scale features using the first plurality of parameters; obtaining second multi-scale features associated with the image features extracted from the second image and warping the second multi-scale features using the second plurality of parameters; generating a second candidate intermediate frame based on the warped first multi-scale features and the warped second multi-scale features; and blending the first candidate intermedia frame with the second candidate intermediate frame to generate the interpolated image.

In accordance with at least one example of the present disclosure, a system for generating an interpolated image is described. The system may include a processor; and memory including instructions, which when executed by the processor, causes the process to: obtain first multi-scale features associated with image features extracted from a first image; obtain second multi-scale features associated with image features extracted from a second image; warp the first multi-scale features using a first plurality of parameters obtained from an adaptive collaboration of flow model; warp the second multi-scale features using a second plurality of parameters obtained from the adaptive collaboration of flow model; and generate a candidate intermediate frame based on the warped first multi-scale features and the warped second multi-scale features.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 5B depicts another example implementation of a compression-driven frame interpolation process in accordance with examples of the present disclosure.

DETAILED DESCRIPTION

Various aspects of the disclosure are described more fully below with reference to the accompanying drawings, which form a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

Conventional video frame interpolation is modeled as an image sequence problem. Unfortunately, such approaches are less effective in complex video scenes due to their inability to accurately estimate the path, or flow, and due to their inability to represent high-frequency components. Convolutional neural networks (CNN) have demonstrated success in understanding temporal motion using flow-based motion interpolation algorithms. One major drawback of the flow-based methods is that only pixel-wise information is used for interpolation. In contrast, kernel-based methods as proposed herein, generate an image by convolving over local patches near each output pixel. In addition, a model employing this kernel-based method may be trimmed, or otherwise compressed, such that the model size is reduced.

Figure 1:
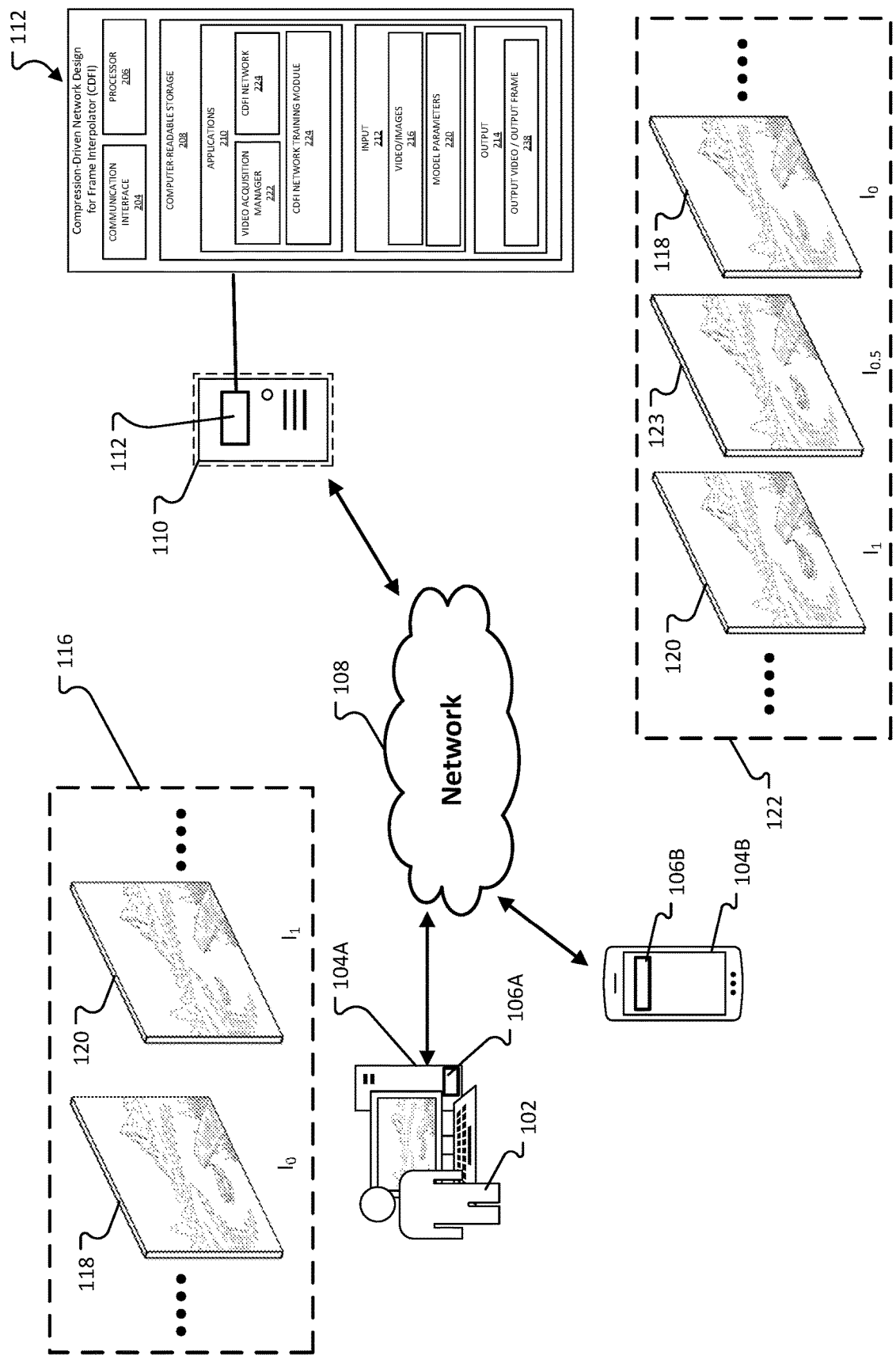
FIG. 1 depicts details of a system for performing video frame interpolation in accordance with examples of the present disclosure.

FIG. 1 depicts details of a system 100 for performing video frame interpolation in accordance with examples of the present disclosure. The system 100 may include one or more computing devices 104A and/or 104B which may run or otherwise execute an application 106A, 106B for performing video frame interpolation. The goal of video frame interpolation is to generate, or synthesize, an intermediate frame between two frames, often adjacent frames. For example, a first video sequence 116 may include a first video frame 118 and a second video frame 120. The first video frame 118 may correspond to $I_0$, while the second video frame 120 may correspond to $I_1$. Given two consecutive frames $I_0$ and $I_1$ in a first video sequence 116, video frame interpolation is implemented to synthesize an intermediate frame $I_t$, where t, is often an arbitrary temporal position between 0 and 1. Commonly, t is equal to 0.5, or midway between a first frame $I_0$ and a second frame $I_1$. For example, as depicted in FIG. 1, a modified video frame sequence 122 may include the first video frame 118 and the second video frame 120. Further, the video frame sequence 122 includes an interpolated frame $I_{0.5}$ 123 synthesized in accordance with examples of the present disclosure.

In examples, the application 106A/106B includes a compression-driven frame interpolation model that has been trained at a network accessible computing device 110 for example. That is, the computing device 110 may correspond to a server, or other computing platform generally accessible via a network 108. The computing device 110 may include an application 112 for training the compression driven frame interpolation model, as discussed in more detail below. In examples, the trained model may then be implemented at one or more of the computing devices 104A/104B used by a user 102.

Figure 2:
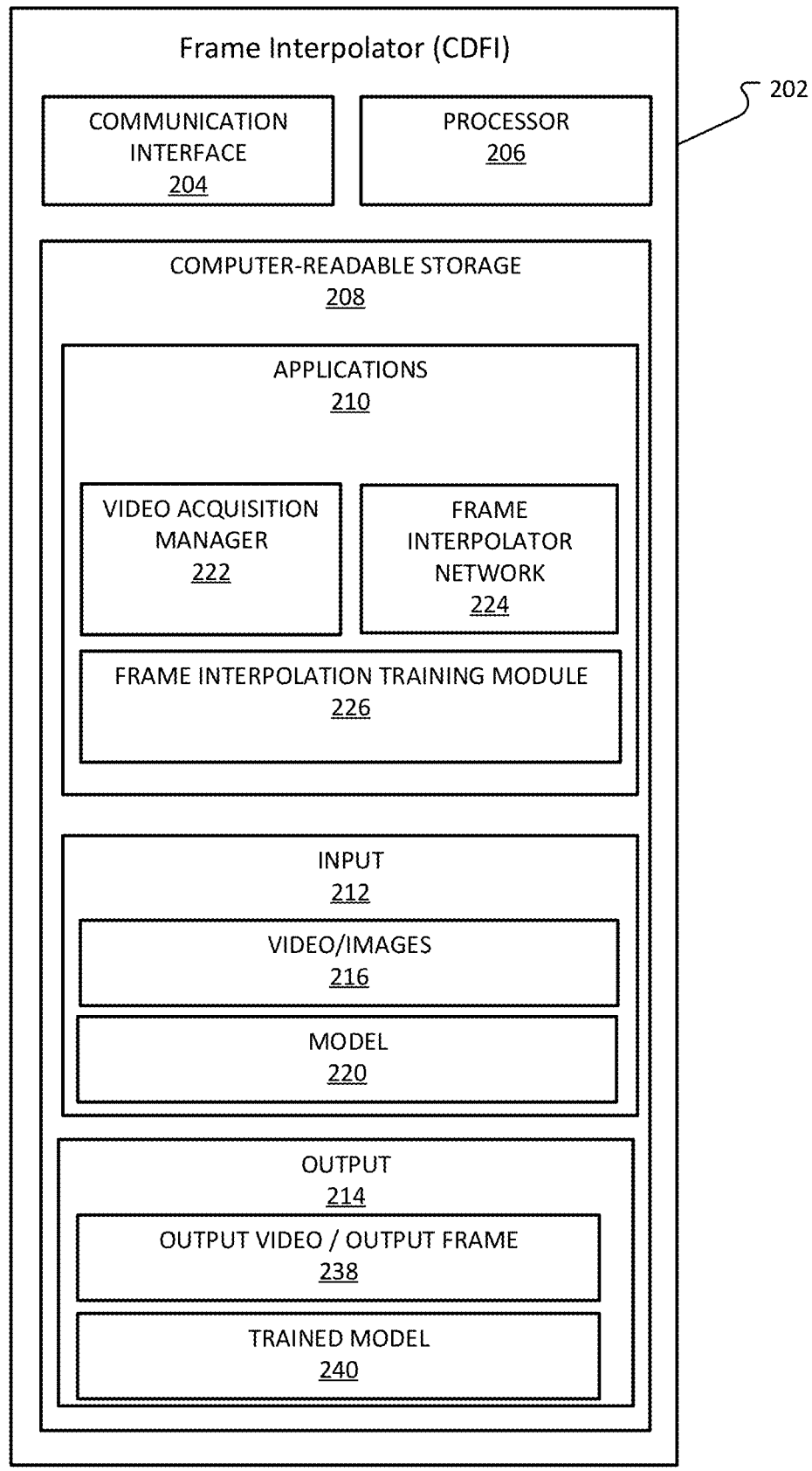
FIG. 2 depicts details of the compression-driven frame interpolator in accordance with examples of the present disclosure.

FIG. 2 depicts details of the compression-driven frame interpolator in accordance with examples of the present disclosure. The compression-driven frame interpolator 202 may include a communication interface 204, a processor 206, and a computer-readable storage 208. In examples, the communication interface 204 may be coupled to a network and receive a first video sequence, such as the first video sequence 116 (FIG. 1). The first video sequence may be stored as video/images 216. In some examples, a compression-driven frame interpolation model may be received at the communication interface 204 and stored as the compression-driven frame interpolation model 220. The compression-driven frame interpolation model 220 may include a trained compression-driven frame interpolation model and associated model weights and/or parameters, where the model weights and/or parameters include one or more parameters and hyperparameters that define the compression-driven frame interpolation model. In examples, the compression-driven frame interpolation model parameters may correspond to a specific compression-driven frame interpolation implementation that is to be implemented at the compression-driven frame interpolator 202. For example, the compression-driven frame interpolation model 220 may refer to a selection of a specific model (e.g., a specific model trained with a specific set of training data) that is made by a user. While the video/images 216 and the compression-driven frame interpolation model 220 are depicted as being input 212, other information and input may be received at the communication interface 204 and stored as input 212.

In examples, one or more applications 210 may be provided by the compression-driven frame interpolator 202. The one or more applications 210 may include a video acquisition manager 222, a compression-driven frame interpolation network 224, and/or a compression-driven frame interpolation training module 226. The video acquisition manager 222 may manage the acquisition of a video sequence, such as the first video sequence 116. The video acquisition manager 222 may store the received video as input 212 as previously described.

Based on the received video sequence, which may be stored as images and/or individual video frames, the compression-driven frame interpolation network as defined by the compression-driven frame interpolation model 220 may generate an interpolated frame as described herein. The interpolated frame may be output as an output video and/or output frame 238. In examples, the compression-driven frame interpolator 202 may generate and train a compression-driven frame interpolation model 220 in accordance with examples of the present disclosure. In examples, the compression-driven frame interpolation model 220 may be a compressed model convolutional model employing a feature pyramid to maintain contextual features. The generated and trained model may be output as the trained model 240. Accordingly, the compression-driven frame interpolator may output an output frame 238 and/or a trained model 240 as output 214.

In examples, the compression-driven frame interpolation model may employ a convolutional architecture using an encoder portion and a decoder portion to generate a first candidate output frame. In examples, a feature pyramid may be utilized to maintain contextual details from the feature space generated in the encoder portion. For example, a feature pyramid may be generated by filtering each of the successive convolutional layers in the encoder portion. In examples, a 1-by-1 convolution may be utilized to obtain fine feature information from the feature space. These "contextual details" from the feature space may then be used to generate a second candidate image frame. The first and second candidate image frames may then be blended to generate an interpolated frame.

In accordance with examples of the present disclosure, the above described model may be compressed by removing portions of the model that exist as an artefact of model architecture but do not contribute to the model output. For example, following training process, a regularization process may be employed to re-generate a model, where during the regularization process, some of the model weights will be pushed to zero indicating that a connecting between a specific neuron and another neuron is non-existent. Accordingly, this information can be used to prune a model to generate a smaller, or compressed, version of the original model.

In examples, the model generation process may include compressing a baseline model and then further improving upon the compressed model to maintain contextual features through the interpolation process. In examples, the baseline model may be based on an adaptive collaboration of flow, and may be compressed by leveraging fine-grained model pruning through sparsity-inducing optimization. More specifically, given a pre-trained full model $M_0$, the pre-trained full model may be fine-tuned by imposing an $\ell_1$ norm sparsity regularizer, and solving an optimization problem according to $$\min_\theta f(\theta|M_\theta) + \lambda\|\theta\|_1,$$

where $f(\cdot)$ denotes the training object for a task and $\lambda>0$ is the regularization constant. With an appropriately selected k, the formulation of the optimization problem promotes a sparse solution, with which important connections among neurons, namely those neurons corresponding to non-zero weights, can be identified. An orthant-based stochastic method may be implemented for its efficient mechanism in promoting sparsity and reduced performance regression compared with other solvers. By solving the $\ell_1$ regularized problem, fine-grained pruning can be performed since zero weights are promoted in an unstructured manner. As another example, group sparsity constraints can be imposed to prune kernel weights in a group-wise fashion.

After obtaining a sparse solution $\hat{\theta}$, a small dense network $M_1$ can be designed based on the sparsity computing for each layer of the network. Given the l-th convolutional layer consisting of $K_l = C_l^{in} \times C_l^{out} \times q \times q$ parameters (denoted $\hat{\theta}_l$), where $C_l^{in}$ is the number of input channels, $C_l^{out}$ is the number of output channels, and q×q is the kernel size, the sparsity $s_l$ and density ratio $d_l$ of this layer are respectively defined as $$s_l = \frac{\text{number of zeros in } \hat{\theta}_l}{K_l}$$

and $d_l := 1 - s_l$, $d_l$ may be used as the compression ratio to compute $\tilde{C}_l^{in} := \lceil d_l \cdot C_l^{in} \rceil$ as the number of kernels needed for the layer. The density ratio $d_l$ reflects the minimal amount of necessary information that needs to be encoded in the specific layer without largely affecting performance. Since $\tilde{C}_{l-1}^{out} = \tilde{C}_l^{in}$, then the above process may be repeated for computing the number of kernels in the (l−1)-th layer by $\tilde{C}_{l-1}^{in} := \lceil d_{l-1} \cdot C_{l-1}^{in} \rceil$, and so on. That is, a small network may be reformulated by updating the number of kernels in each convolution layer according to its density ratio. The above process can be implemented in fully convolutional networks by reducing the number of input/output channels for each layer, leading to a much more compact architecture. Further, this process can be extensible to other architectures by re-computing the number of input/output features.

The compressed model $M_1$ may then be trained from scratch (without the $\ell_1$ constraint) to verify its performance. Typically, the training process takes a significantly shorter amount of time than the amount of time to train the full model $M_0$ due to the model's compactness. In examples, the pre-trained $M_1$ model is not a necessity for the sake of compression since $M_1$ can be trained using a one-shot training/pruning process, but $M_0$ can be used to verify the compressed model is similarly competitive in terms of function.

Figure 3:
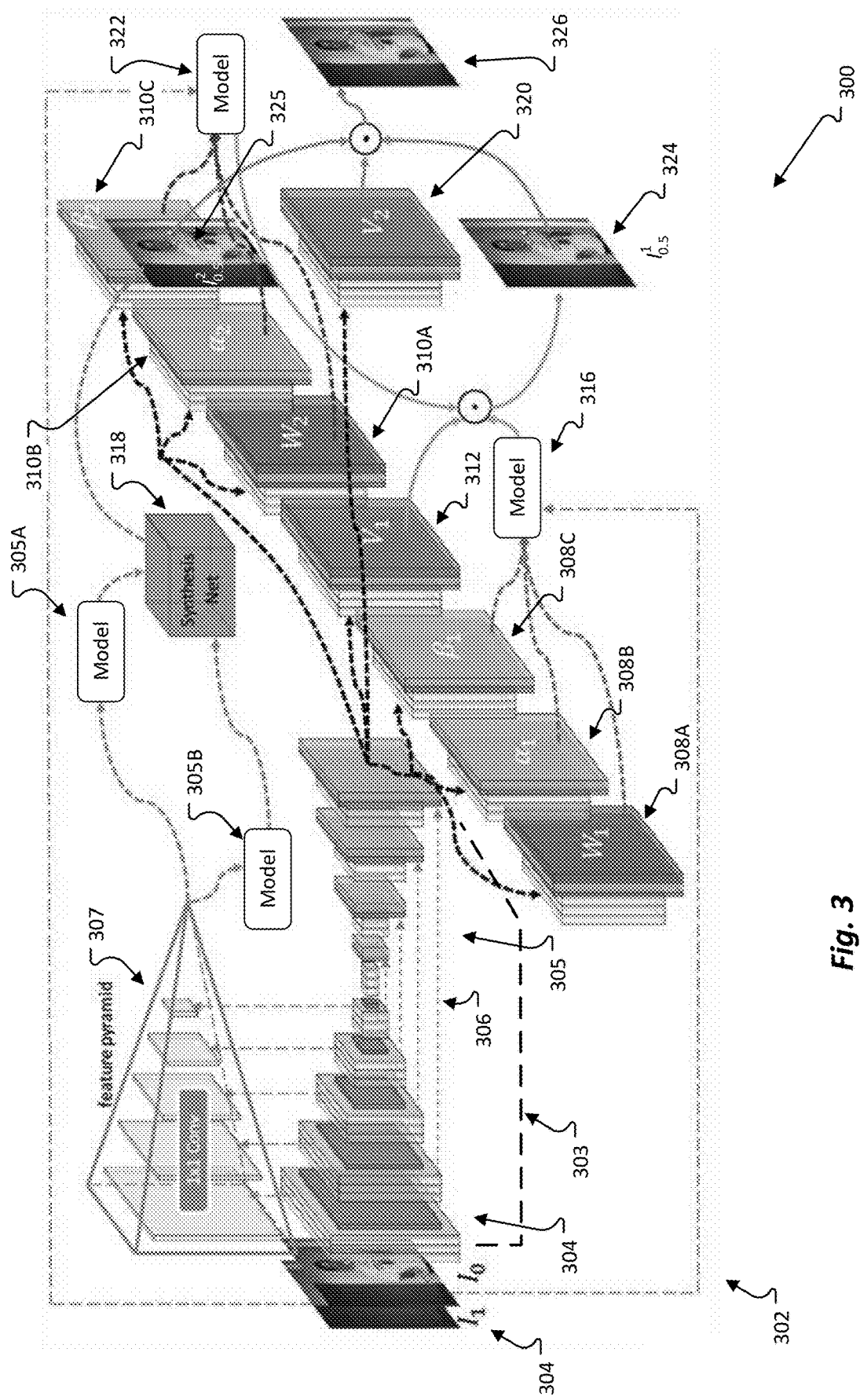
FIG. 3 depicts details of an example architecture for generating an interpolated image in accordance with examples of the present disclosure.

FIG. 3 depicts details of an example architecture 300 for generating an interpolated image in accordance with examples of the present disclosure. More specifically, the architecture 300 may incorporate features of an adaptive collaboration of flow model, together with a feature pyramid for maintaining contextual information throughout the interpolation process. Although examples provided herein describe the use of an adaptive collaboration of flow model, the described feature pyramid and synthesis network may be implemented using other models where one or more parameters may describe pixel movement and/or pixel occlusion.

An adaptive collaboration of flow model may be used to synthesize a target pixel by estimating multiple flows, called offset vectors that point to reference locations that can be sampled. A target pixel is obtained by linearly combining the sampled values. As the adaptive collaboration of flow model is used as an independent module for frame warping and not feature extraction, weights as an output of the neural network may be obtained, instead of training the weights as a learnable parameter. Further, an occlusion mask may be utilized when one of the reference pixels is occluded.

As depicted in FIG. 3, a fully convolutional neural network 302 that implements an adaptive collaboration of flow model and estimates kernel weights $W_{k,l}$, offset vectors ($\alpha_{k,l}$, $\beta_{k,l}$), and occlusion map $V_1$ is depicted. As each module of the neural network is differentiable, it is end-to-end trainable. The neural network of FIG. 3 starts with the U-Net architecture 303, which includes an encoder portion 304, a decoder portion 305, and a skip connection portion 306. While the U-Net architecture 303 is depicted in FIG. 3, other fully convolutional networks that include successive convolutional layers and successive upsampling layers are contemplated. The U-Net architecture 303 includes a large number of feature channels in the decoder portion 305, which allows the network to propagate contextual information to higher resolution layers. For the encoder portion 304, average pooling may be used to extract the features. For the decoder portion 305, a bilinear interpolation may be used for upsampling operations. After the U-Net architecture 303, seven sub-networks (e.g., 308A-C, 310A-C, and 312) are utilized to estimate the outputs ($W_{k,l}$, $\alpha_{k,l}$, $\beta_{k,l}$ for each frame and $V_1$). A sigmoid activation function may be used for $V_1$ to satisfy $V_1 \in [0,1]^{M \times N}$, where the input and output images are M×N.

In examples, the input image $I_{in}$ (e.g., $I_1$ 304) is padded such that $I_{out}$ 324 preserves the original shape of $I_{in}$ (e.g., $I_1$ 304). For each pixel (i, j) in $I_{out}$ 324 the adaptive collaboration of flow model computes $I_{out}(i, j)$ by convolving a deformable patch surrounding the reference pixel (i, j) in $I_{in}$ according to: $\Sigma_{k=0}^{F-1} \Sigma_{l=0}^{F-1} W_{i,j}^{(k,l)} I_{in}(i+dk+\alpha_{i,j}^{(k,l)}+dl+\beta_{i,j}^{(k,l)})$, where F is a deformable kernel size, $W_{i,j}^{(k,l)}$ is the (k, l)-th kernel weight in synthesizing $I_{out}(i, j)$, $\vec{\Delta} := \alpha_{i,j}^{(k,l)}, \beta_{i,j}^{(k,l)}$ the offset vector of the k-th sampling point associated with $I_{out}(i, j)$, and $d \in \{1, 2, 3, 4 \ldots\}$ is the dilution parameter that helps to explore a wider area. Values of F and d are pre-determined; for synthesizing each output pixel in $I_{out}$ 324, a total number of $F^2$ points are sampled in $I_{in}$ (e.g., $I_1$ 304). With the offset vector, $\vec{\Delta}$, the $F^2$ sampling points may not be restricted to an inside of a rigid rectangular region centered at the reference point. The adaptive collaboration of flow model uses different kernel weights across different reference pixels (i,j), as indicated by $W_{i,j}^{(k,l)}$.

In the adaptive collaboration of flow model, the final interpolation frame (e.g., first candidate interpolation image 324) is computed by blending the two warped frames through a single sigmoid mask $V_1$, (e.g., 312) which is a generalization of using a binary mask to determine the occlusion weights of the two warped frames for each output pixel, where a warped frame is obtained by displacing pixels in an input frame. With only raw pixel information, contextual details are lost in the input frames since no guidance is provided from the feature space.

In accordance with examples of the present disclosure, a feature pyramid representation of the input frames from the encoder portion 304 of the U-Net architecture 303 may be utilized. In examples, a feature pyramid 307 may have the same number of feature levels as the encoder portion 304, where for each level, a 1-by-1 convolution is utilized to filter the encoded features at multiple scales. For example, there may be 4, 8, 12, 16, and then 20 output features (in descending order by the feature scale). The extracted multi-scale features are then warped using an adaptive collaboration of flow operation (e.g., 305A for $I_0$ and 305B for $I_1$), which imparts and then captures the motion in the feature space. In some examples, the input frames and/or the extracted multi-scale features may be warped using another operation, where the process of warping includes obtaining an output by displacing pixels, or values, of an input.

A network architecture, such as the synthesis network 318, may be used to synthesize a candidate image 325. More particularly, the synthesis network 318 may be provided with both the forward and backward-warped multi-scale feature maps, generating a single RGB image (e.g., candidate image 325) that focuses on the contextual details.

In order to take advantage of both the way that the adaptive collaboration of flow model handles complex motion, and feature pyramid 307 as described above which handles contextual details, a path selection mechanism may be employed when generating a final interpolation result 326. For example, one path leads to an output (e.g., first candidate interpolation image 324) of the original adaptive collaboration of flow model (denoted as $I_{0.5}^1$ first candidate interpolation image 324), which is computed by blending two warped input frames using the occlusion mask $V_1$ 312. Parallel to this path, another path leads to the output of the synthesis network 318 (denoted as $I_{0.5}^2$ candidate image 325), which is computed by combining the warped multi-scale feature maps. Another occlusion module $V_2$ 320 may be learned to synthesize the final result from $I_{0.5}^1$ and $I_{0.5}^2$, where $I_{0.5}^2$ compensates for the lack of contextual information in $I_{0.5}^1$.

Figure 4A:
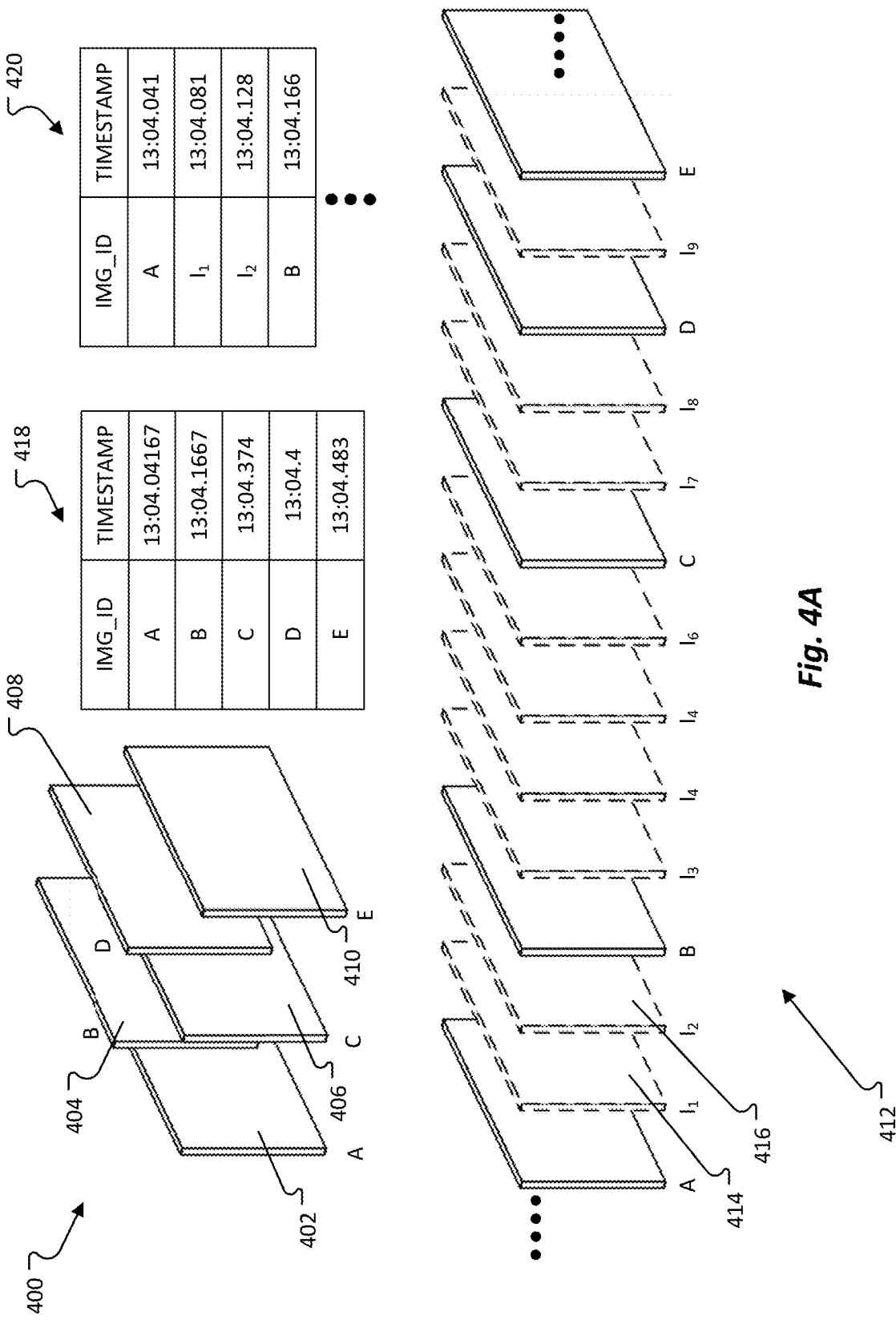
FIG. 4A depicts additional details of an example frame interpolation process in accordance with examples of the present disclosure.

FIG. 4A depicts additional details of an example frame interpolation process in accordance with examples of the present disclosure. In examples, an input video sequence 400 may include video frames, or images, 402, 404, 406, 408, and 410. A compression-driven frame interpolator, as the compression-driven frame interpolator 202, may receive the input video sequence 400 and generate additional frames between various frames of the input video sequence 400 to generate an output video sequence 412. In examples, an interpolated frame $I_1$ 414 may be synthesized based on video images 402 and 404. Further, an interpolated frame $I_2$ 416 may be synthesized based on the interpolated image $I_1$ 414 and the video image 404. Accordingly, the output video sequence 412 may include a plurality of video images from the input video sequence 400 together with a plurality of synthesized images. As further depicted in FIG. 4, each of the video images 402, 404, 406, 408, and 410 may be associated with a timestamp as depicted in the data structure 418. After an interpolation process, a data structure 420 may include the images of the input sequence together with interpolated images $I_1$ and $I_2$.

Figure 4B:
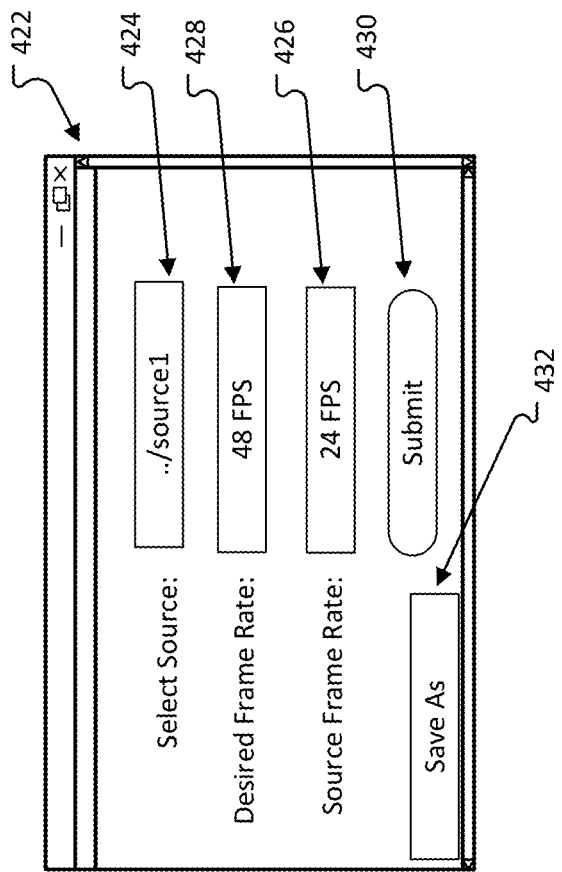
FIG. 4B depicts a user interface for converting an input video sequence, such as the input video sequence, from a first frame rate to a second frame rate.

FIG. 4B depicts a user interface for converting an input video sequence, such as the input video sequence 400, from a first frame rate to a second frame rate. For example, the user interface 422 may be displayed at a display device such that a user may select a source 424, or location, of an input video sequence. A current, or source frame rate 426 may be displayed at the user interface 422. A control 428 may allow a user to select a desired frame rate such that when a user selects the submit control 430, a compression-driven frame interpolation process generates an output video sequence, such as the output video sequence 412. A user may then save the output video sequence using the control 432. Accordingly, implementing the compression-driven frame interpolation process from a user perspective requires the user to select the input video sequence and a desired output frame rate.

Figure 5A:
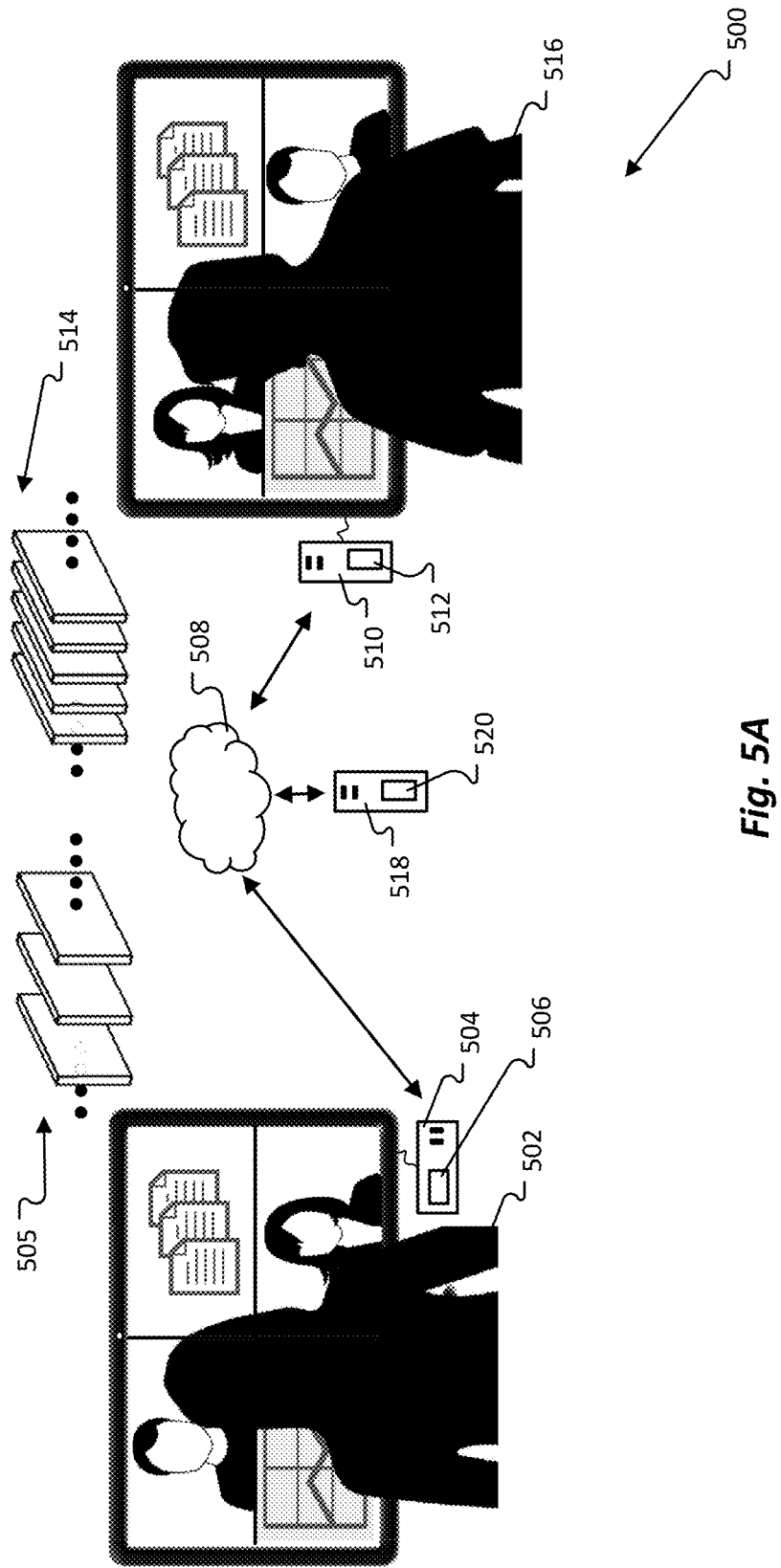
FIG. 5A depicts an example implementation of a compression-driven frame interpolation process in accordance with examples of the present disclosure.

FIG. 5A depicts an example implementation of a compression-driven frame interpolation process in accordance with examples of the present disclosure. In examples, a first user 502 may utilize a computing device 504 for performing a video conference using a video conferencing application 506. The video conferencing application 506 may selectively drop, or otherwise remove, one or more frames of video acquired by the computing device 504 such that a video sequence 505 is obtained. The video sequence 505 may include an image of the first user 502 for example together with other information, such as a spreadsheet or graph. The video sequence 505 may be transmitted over the network 508 to another computing device 510, where the computing device 510 may execute a same or similar video conferencing application 512 as the video conferencing application 506.

In examples, the video conferencing application 506 may utilize a compression-driven frame interpolation process to increase the frame rate of the video sequence 505 to a second different frame rate as indicated by the video sequence 514. The second frame rate may be faster than the first frame rate. Accordingly, when the video sequence 514 is presented to a display device, when viewed by a user 516, the video sequence 514 appears to be smooth or otherwise natural. Further, because one or more frames were removed or dropped as indicated in the video sequence 505, an amount of information required to send a video sequence may be reduced, as a receiving device may synthesize images or frames using the compression-driven interpolation process as described herein. In some examples, a server 518 may receive the video sequence 505 and generate the video sequence 514 using an application 520. Alternatively, or in addition, the server 518 may receive a video sequence at a first frame rate, drop or remove one or more frames or images to generate a second video sequence that is at a second lower frame rate, and then transmit the video sequence having the second lower frame rate to one or more devices for interpolation.

FIG. 5B depicts another example implementation of a compression-driven frame interpolation process in accordance with examples of the present disclosure. In examples, an application 523 executing or otherwise running at a computing device 524 may acquire a first image 526 with the boat farther from the pier and a second image 528 with the boat closer to the pier. The application 523 may generate an interpolated image 530 using a compression-driven frame interpolator as described to create image 530, with the boat located in between locations depicted in images 526 and 528. For example, the compression-driven frame interpolator 202 may be utilized to generate image 530. Thus, a user may view an image that was not actually acquired by the computing device 524, but instead was created by interpolating such image.

Figure 6:
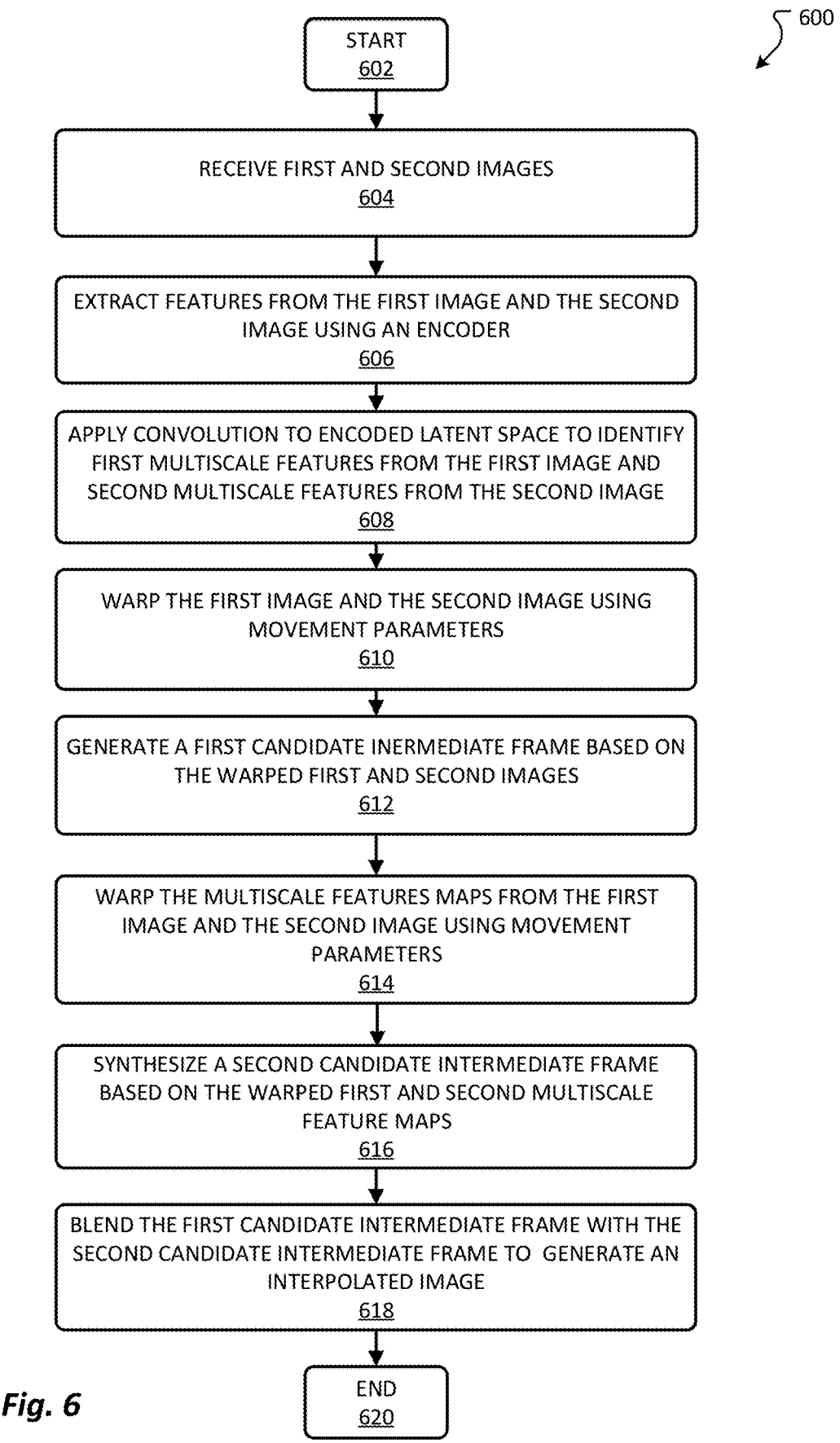
FIG. 6 illustrates an example method for interpolating a frame of video in accordance with examples of the present disclosure.

FIG. 6 illustrates an example method 600 for interpolating a frame of video in accordance with examples of the present disclosure. A general order of the operations for the method 600 is shown in FIG. 6. Generally, the method 600 begins with start operation 602 and ends with end operation 620. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1-5

Following start operation 602, the method 600 receives first and second images of a video sequence at 604. In examples, an interpolated image is to be generated that resides between the received first and second images. Accordingly, at 606, features from the first image may be extracted. For example, using the encoder portion 304 of the U-Net architecture 303, a convolution operation may occur using the first image to generate first image features. Further, features from the second image may be extracted. For example, using the encoder portion 304 of the U-Net architecture 303, a convolution operation may occur using the second image to generate second image features. At 608, using a feature pyramid, such as the feature pyramid of 307 of FIG. 3, a convolution operation may be applied to the encoded latent space including the encoded first image features to obtain or otherwise identify first multiscale features. Similarly, using the feature pyramid, such as the feature pyramid of 307 of FIG. 3, a convolution operation may be applied to the encoded latent space including the encoded second image features to obtain or otherwise identify second multiscale features. In each of the convolution operations, the filter may be a one-by-one filter.

At 610, the first image and the second image may be warped using the movement parameters from the trained model. For example, the seven sub-networks (e.g., 308A-C, 310A-C, and 312 of FIG. 3) are utilized to estimate the outputs ($W_{k,l}$, $\alpha_{k,l}$, $\beta_{k,l}$ for each frame and $V_1$). Accordingly, at 612, the warped first image and the warped second image may be synthesized using an adaptive collaboration of flow model together with the occlusion mask $V_1$. At 614, the extracted multi-scale features are then warped using an adaptive collaboration of flow operation, which imparts and then captures the motion in the feature space. At 616, a synthesis network, such as the synthesis network 318 of FIG. 3, may be used to synthesize a second candidate image (e.g., 325 of FIG. 3). More particularly, the synthesis network 318 may be provided with both the forward and backward-warped multi-scale feature maps, generating a single RGB image (e.g., candidate image 325) that focuses on the contextual details. At 618, the first candidate image and the second candidate image may be blended to generate a final interpolated image. The method 600 may then end at 620.

Figure 7:
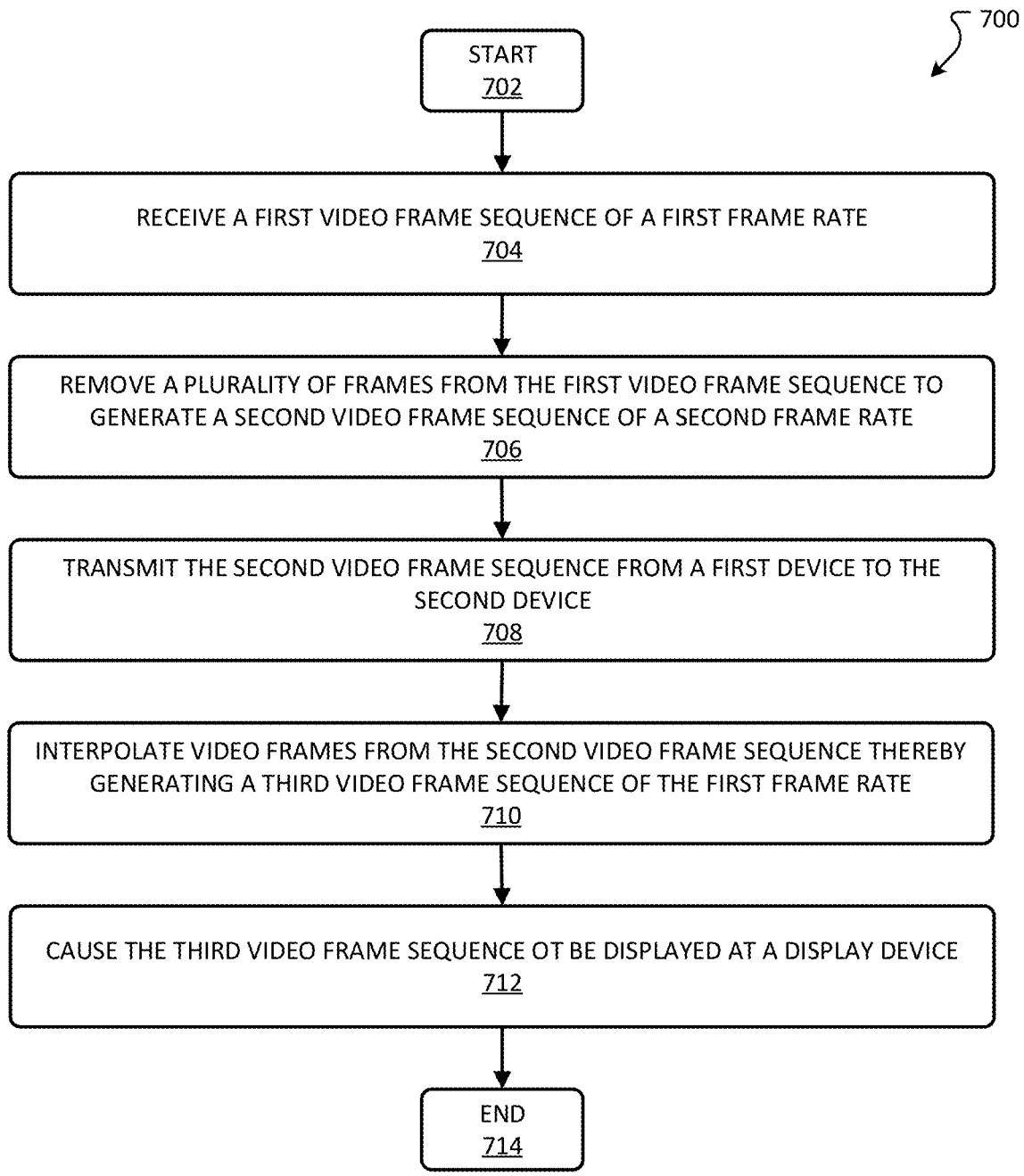
FIG. 7 illustrates an example method for compressing and decompressing a video frame sequence in accordance with examples of the present disclosure.

FIG. 7 illustrates an example method 700 for compressing and decompressing a video frame sequence in accordance with examples of the present disclosure. That is, method 700 may generate an interpolated video sequence from a video sequence of a lower frame rate in accordance with examples of the present disclosure. A general order of the operations for the method 700 is shown in FIG. 7. Generally, the method 700 begins with start operation 702 and ends with end operation 714. The method 700 may include more or fewer steps or may arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, an ASIC, an FPGA, a SOC or other hardware device. Hereinafter, the method 700 shall be explained with reference to the systems, components, devices, modules, software, data structures, data characteristic representations, signaling diagrams, methods, etc., described in conjunction with FIGS. 1-6

Following start operation 704, the method 700 receives a first video frame sequence. The first video frame sequence may be at a first frame rate. The method 700 may proceed to 706, where the first video frame sequence may be converted to a second video frame sequence having a lower or otherwise reduced frame rate. For example, one or more frames of the first video sequence may be removed or otherwise discarded to obtain the second video frame sequence. In examples, because the second video frame sequence includes fewer frames than the first video frame sequence, the second video frame sequence may be considered a compressed version of the first video frame sequence.

The method 700 may proceed to 708, where the second video frame sequence may be transmitted from a first device to a second device. For example, a first device may be a general computing device and a second device may be a mobile device. At 710, a plurality of frames may be interpolated at the second device. In examples, a compression-driven frame interpolator, such as the compression-driven frame interpolator 202 of FIG. 2, may be utilized to generate a plurality of interpolated frames. Accordingly, a third video sequence including video frames of the second video sequence and the plurality of interpolated frames may be displayed at a display of the second device at 712. The method 700 may end at 714.

Figure 8:
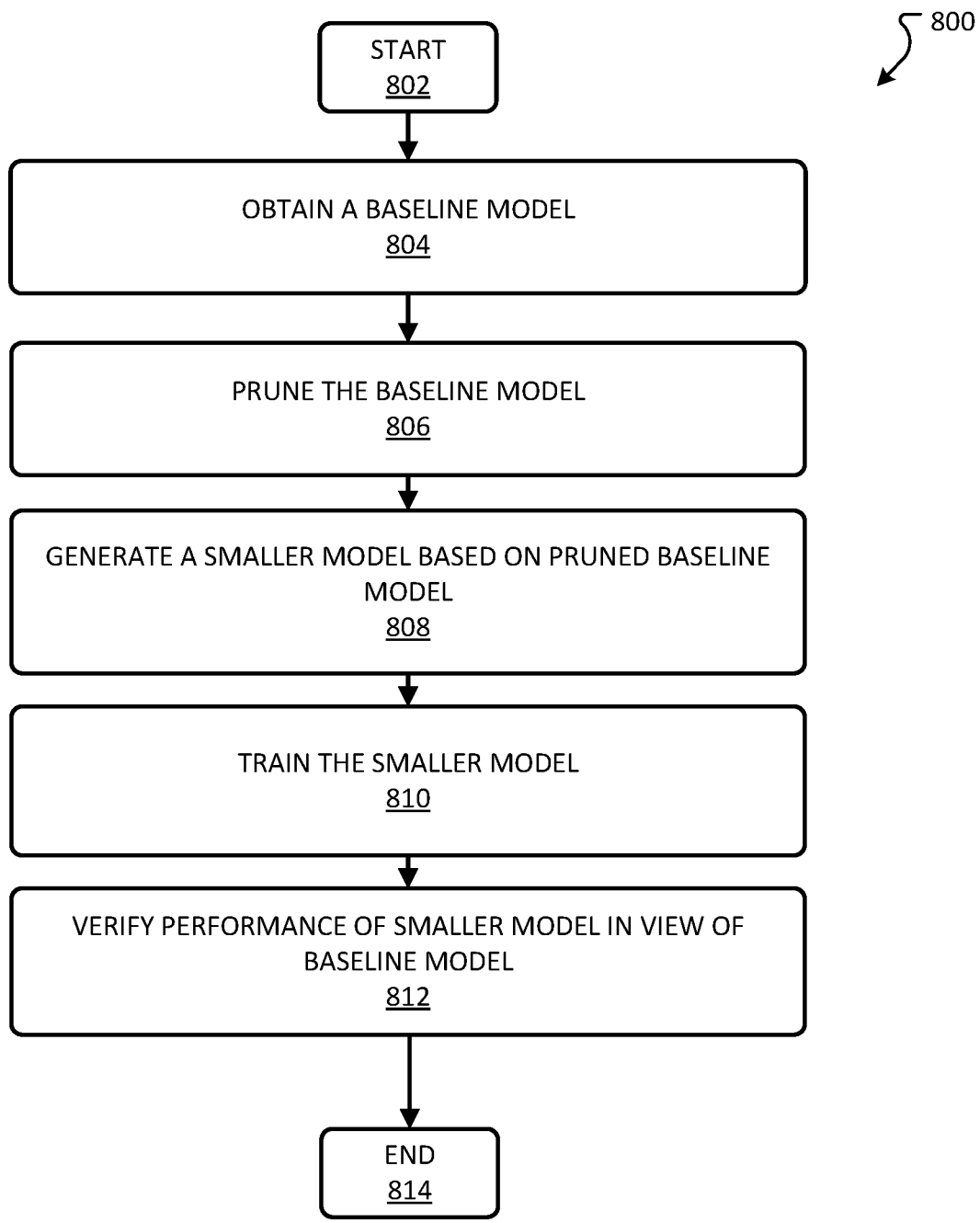
FIG. 8 illustrates an example method for obtaining a compressed model in accordance with examples of the present disclosure.

FIG. 8 illustrates an example method 800 for obtaining a compressed model in accordance with examples of the present disclosure. A general order of the operations for the method 800 is shown in FIG. 8. Generally, the method 800 begins with start operation 802 and ends with end operation 814. The method 800 may include more or fewer steps or may arrange the order of the steps differently than those shown in FIG. 8. The method 800 can be executed as a set of computer-executable instructions executed by a computer system and encoded or stored on a computer readable medium. Further, the method 800 can be performed by gates or circuits associated with a processor, an ASIC, an FPGA, a SOC or other hardware device. Hereinafter, the method 800 shall be explained with reference to the systems, components, devices, modules, software, data structures, data characteristic representations, signaling diagrams, methods, etc., described in conjunction with FIGS. 1-7.

In examples, the model generation process may include compressing a baseline model and then further improving upon the compressed model to maintain contextual features through the interpolation process. Accordingly, at 804, a baseline model may be obtained. In examples, the baseline model may be based on an adaptive collaboration of flow model. At 806, the baseline model may be compressed by leveraging fine-grained model pruning through sparsity-inducing optimization.

After obtaining a sparse solution, a small dense network $M_1$ can be generated at 808 based on the sparsity computing for each layer of the pruned baseline model. That is, a small network may be reformulated by updating the number of kernels in each convolution layer according to a density ratio. The above process can be implemented in fully convolutional networks by reducing the number of input/output channels for each layer, leading to a much more compact architecture. At 810, the compressed model $M_1$ may then be trained from to verify its performance. In examples, the pre-trained $M_1$ model can be trained using a one-shot training/pruning process, and $M_0$ can be used to verify the compressed model at 812 is similarly competitive in terms of function. The method 800 may then end at 814.

Figure 9:
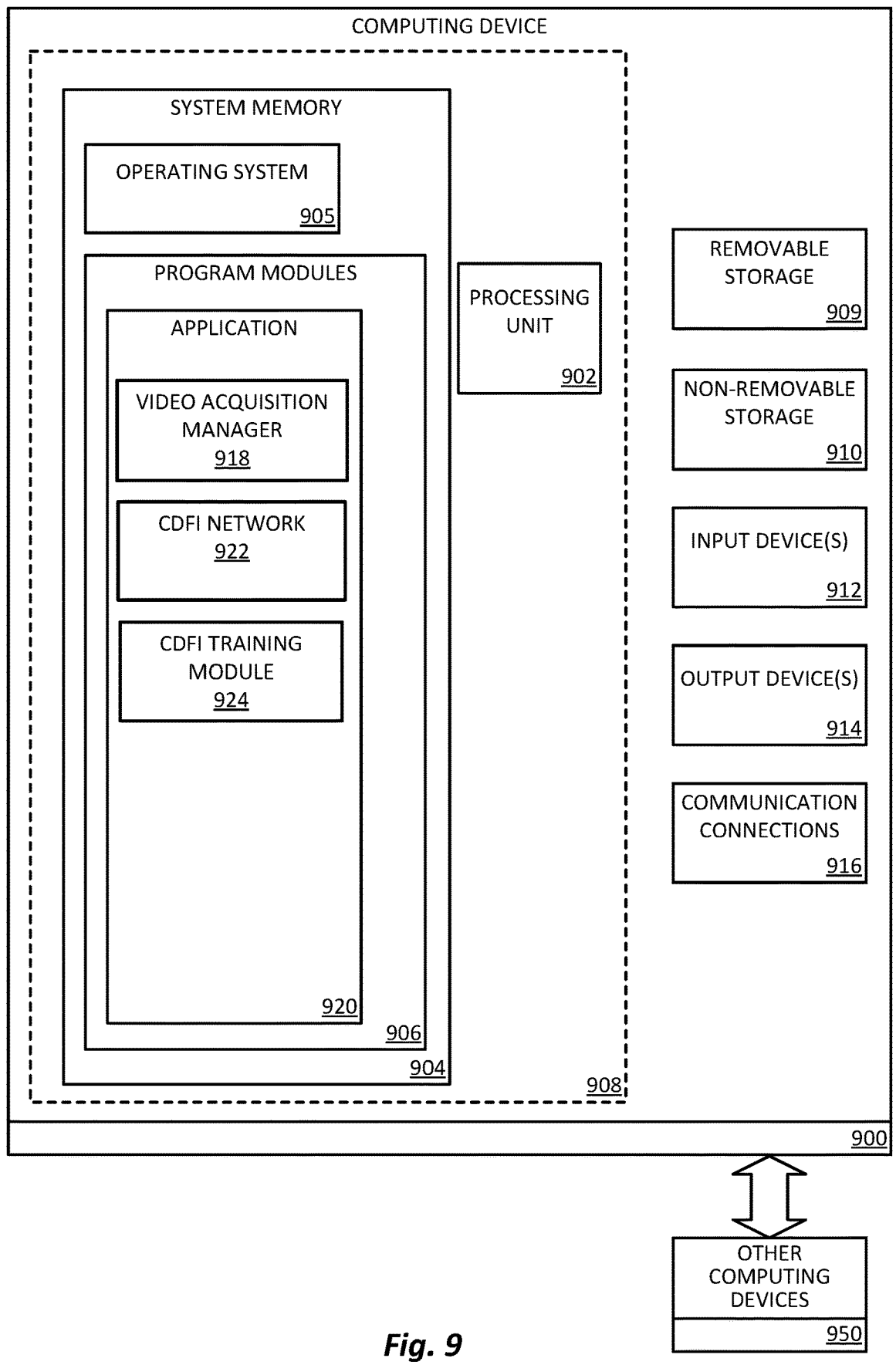
FIG. 9 is a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device components described below may be suitable for the computing devices described above. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for performing the various aspects disclosed herein such. The operating system 905, for example, may be suitable for controlling the operation of the computing device 900. Furthermore, aspects of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program tools and data files may be stored in the system memory 904. While executing on the at least one processing unit 902, the program modules 906 (e.g., an application 920) may perform processes including, but not limited to, the aspects, as described herein. The application 920 includes a video acquisition manager 918, a compression-driven frame interpolator network 922, and a compression-driven frame interpolation training module 924. In examples, the video acquisition manager 918 may be the same as or similar to the video acquisition manager 222 of FIG. 2; the compression-driven frame interpolator network 922 may be the same as or similar to the compression-driven frame interpolator network 224 of FIG. 2; and the compression-driven frame interpolation training module 924 may be the same as or similar to the compression-driven frame interpolation training module 226 of FIG. 2. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 900 may also have one or more input device(s) 912, such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of the communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
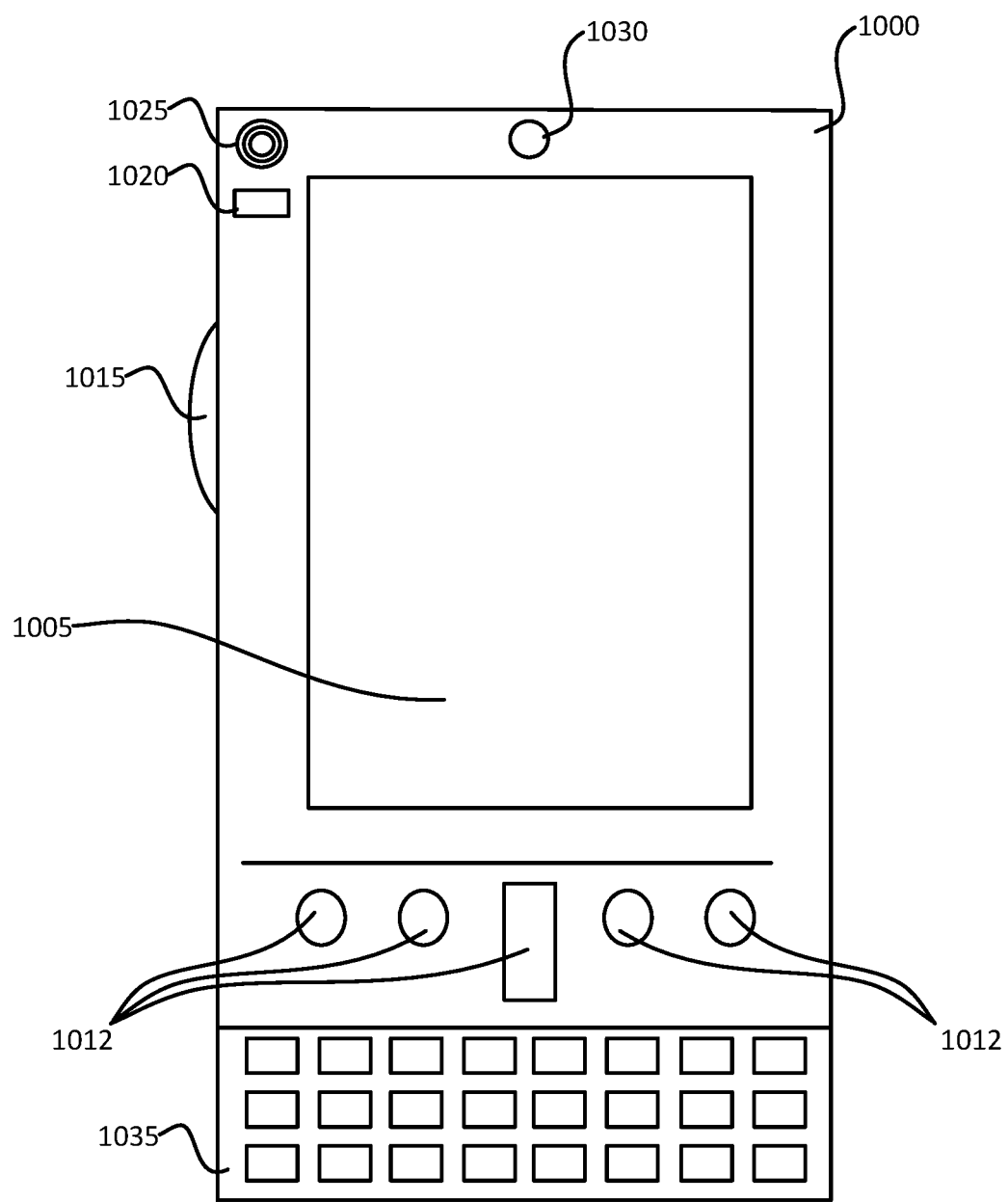
FIG. 10A is a simplified diagram of a mobile computing device with which aspects of the present disclosure may be practiced.
Figure 10B:
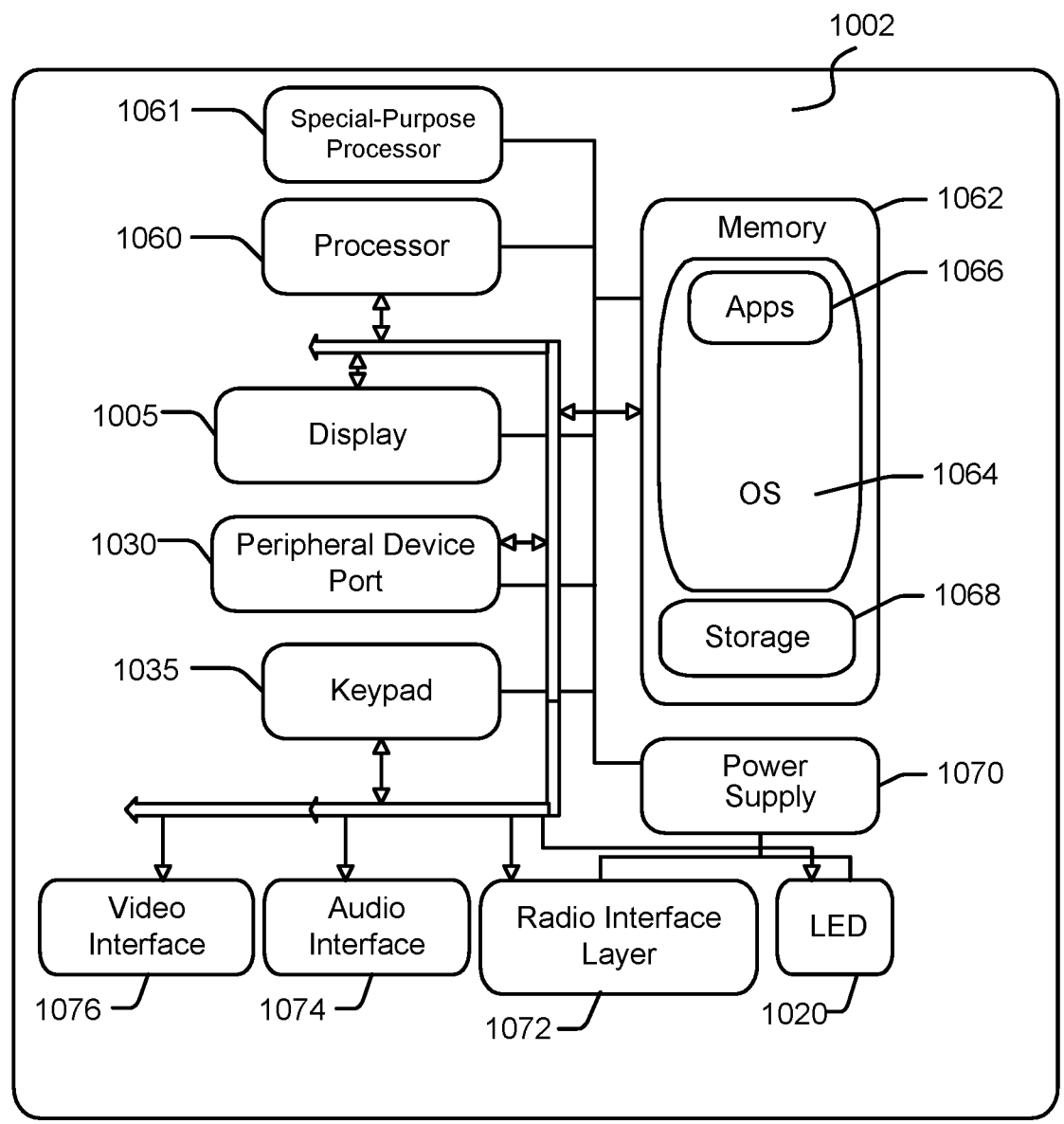
FIG. 10B is another simplified block diagram of a mobile computing device with which aspects of the present disclosure may be practiced.

FIGS. 10A and 10B illustrate a computing device or mobile computing device 1000, for example, a mobile telephone, a smart phone, wearable computer (such as a smart watch), a tablet computer, a laptop computer, and the like, with which aspects of the disclosure may be practiced. In some aspects, the client utilized by a user may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included as an optional input element, a side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some aspects. In yet another alternative aspect, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various aspects, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of computing device, a server, a mobile computing device, etc. That is, the mobile computing device 1000 can incorporate a system 1002 (e.g., a system architecture) to implement some aspects. The system 1002 can implemented as a "smart phone" capable of running one or more applications (e.g., browser, e-mail, calendaring, contact managers, messaging clients, games, and media clients/players). In some aspects, the system 1002 is integrated as a computing device, such as an integrated digital assistant (PDA) and wireless phone.

One or more application programs 1066 may be loaded into the memory 1062 and run on or in association with the operating system 1064. Examples of the application programs include phone dialer programs, e-mail programs, information management (PIM) programs, word processing programs, spreadsheet programs, Internet browser programs, messaging programs, video programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein.

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 (e.g., LED) may be used to provide visual notifications, and/or an audio interface 1074 may be used for producing audible notifications via the audio transducer 1025. In the illustrated configuration, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with aspects of the present disclosure, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
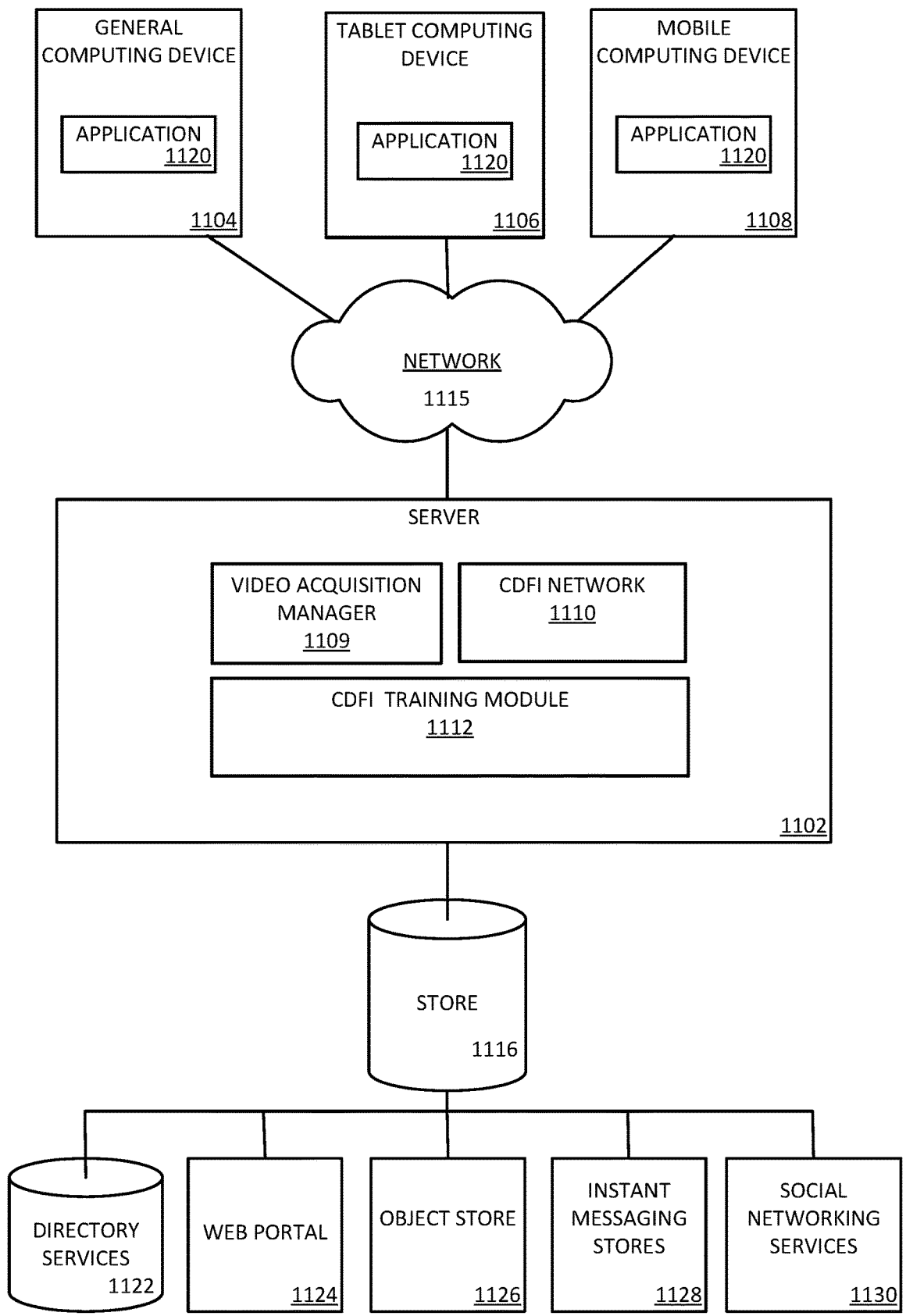
FIG. 11 illustrates one aspect of the architecture of a system for processing data received at a computing system from a remote source.

FIG. 11 illustrates one aspect of the architecture of a system for processing data received at a computing system from a remote source, such as a personal computer 1104, tablet computing device 1106, or mobile computing device 1108, as described above. The personal computer 1104, tablet computing device 1106, or mobile computing device 1108 may include one or more applications 1120; such applications may include but is not limited to the video acquisition manager 1109, a compression-driven frame interpolator network 1110, and a compression-driven frame interpolation training module 1112. In examples, the video acquisition manager 1109 may be the same as or similar to the video acquisition manager 222 of FIG. 2; the compression-driven frame interpolator network 1110 may be the same as or similar to the compression-driven frame interpolator network 224 of FIG. 2; and the compression-driven frame interpolation training module 1112 may be the same as or similar to the compression-driven frame interpolation training module 226 of FIG. 2. Content at a server device 1102 may be stored in different communication channels or other storage types. For example, various documents may be stored using a directory service 1122, a web portal 1124, an object store 1126, an instant messaging store 1128, or social networking services 1130.

One or more of the previously described program modules 906 or software applications 920 may be employed by server device 1102 and/or the personal computer 1104, tablet computing device 1106, or mobile computing device 1108, as described above. For example, the server device 1102 may include the video acquisition manager 1109, a compression-driven frame interpolator network 1110, and a compression-driven frame interpolation training module 1112. In examples, the video acquisition manager 1109 may be the same as or similar to the video acquisition manager 222 of FIG. 2; the compression-driven frame interpolator network 1110 may be the same as or similar to the compression-driven frame interpolator network 224 of FIG. 2; and the compression-driven frame interpolation training module 1112 may be the same as or similar to the compression-driven frame interpolation training module 226 of FIG. 2.

The server device 1102 may provide data to and from a client computing device such as a personal computer 1104, a tablet computing device 1106 and/or a mobile computing device 1108 (e.g., a smart phone) through a network 1115. By way of example, the computer system described above may be embodied in a personal computer 1104, a tablet computing device 1106 and/or a mobile computing device 1108 (e.g., a smart phone). Any of these examples of the computing devices may obtain content from the store 1116, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The present disclosure relates to a neural network for generating an interpolated image according to at least the examples provided in the sections below:

(A1) In accordance with examples of the present disclosure, a neural network configured to generate an interpolated image based on a first image and a second image is described. The convolutional neural network may include a first network including an encoder and a decoder, the first network configured to: extract first features from the first image, and extract second features from the second image; and a feature pyramid configured to: extract multi-scale features from encoded first features, and extract multi-scale features from encoded second features; a synthesis network configured to: warp the first features from the first image using a first plurality of parameters, warp the multi-scale features extracted from the encoded first features using the first plurality of parameters, warp the second features from the second image using a second plurality of parameters, warp the multi-scale features extracted from the encoded second features using the second plurality of parameters, generate a first candidate intermediate frame based on the warped first features and the warped second features, generate a second candidate intermediate frame based on the warped multi-scale features extracted from the encoded first features and the warped multi-scale features extracted from the encoded first features, and blend the first candidate intermediate frame and the second candidate intermediate frame to generate an interpolated frame.

(A2) In accordance with at least one example of A1, the neural network may include using a 1×1 convolution to filter multi-scale encoded features and extract the multi-scale features from the encoded first features and the encoded second features.

(A3) In accordance with at least one example of at least one of A1-A2, the extracted multi-scale features are obtained at different spatial dimensions and at different levels of the encoder.

(A4) In accordance with at least one example of at least one of A1-A3, the second image is an interpolated image.

(A5) In accordance with at least one example of at least one of A1-A4, the first image and the second image are adjacent frames in a video sequence.

(A6) In accordance with at least one example of at least one of A1-A5, the synthesis network is configured to: generate the first candidate intermediate frame based on the warped first features and the warped second features using a first learned occlusion mask, and blend the first candidate intermediate frame and the second candidate intermediate frame using a second learned occlusion mask.

(A7) In accordance with at least one example of at least one of A1-A6, the convolutional neural network is generated based on a sparse solution obtained for another convolutional neural network.

In yet another aspect, some examples include a computing system including one or more processors and memory coupled to the one or more processors, the memory storing one or more programs configured to be executed by the one or more processors, the one or more programs including instructions for generating a neural network according to any one of A1-A7 described above.

In yet another aspect, some examples include a non-transitory computer-readable storage medium storing one or more programs for execution by one or more processors of a storage device, the one or more programs including instructions for generating a neural network according to any one of A1-A7 described above.

The present disclosure relates to systems and methods for generating an interpolated image according to at least the examples provided in the sections below:

(B1) In accordance with examples of the present disclosure, a method of generating an interpolated image is described. The method may include receiving a first image and a second image at a neural network; extracting image features from the first image and warping the image features from the first image using a first plurality of parameters; extracting image features from the second image and warping the image features from the second image using a second plurality of parameters; generating a first candidate intermediate frame based on the warped first features and the warped second features; obtaining first multi-scale features associated with the image features extracted from the first image and warping the first multi-scale features using the first plurality of parameters; obtaining second multi-scale features associated with the image features extracted from the second image and warping the second multi-scale features using the second plurality of parameters; generating a second candidate intermediate frame based on the warped first multi-scale features and the warped second multi-scale features; and blending the first candidate intermedia frame with the second candidate intermediate frame to generate the interpolated image.

(B2) In accordance with at least one example of B1, the method includes using a 1×1 convolution to filter multi-scale encoded features and obtain the first multi-scale features associated with the image features extracted from the first image; and using the 1×1 convolution to filter multi-scale encoded features and obtain the second multi-scale features associated with the image features extracted from the second image.

(B3) In accordance with at least one example of at least one of B1-B2, the first extracted multi-scale features are obtained at different spatial dimensions and at different levels of an encoder.

(B4) In accordance with at least one example of at least one of B1-B3, the second image is an interpolated image.

(B5) In accordance with at least one example of at least one of B1-B4, the first image and the second image are adjacent frames in a video sequence.

(B6) In accordance with at least one example of at least one of B1-B5, the method includes generating the first candidate intermediate frame based on the warped first features and the warped second features using a first learned occlusion mask; and blending the first candidate intermediate frame and the second candidate intermediate frame using a second learned occlusion mask, wherein the first learn occlusion mask is different from the second learning occlusion mask.

(B7) In accordance with at least one example of at least one of B1-B6, the method includes generating the neural network based on a sparse solution obtained for another neural network.

In yet another aspect, some examples include a computing system including one or more processors and memory coupled to the one or more processors, the memory storing one or more programs configured to be executed by the one or more processors, the one or more programs including instructions for performing any of the methods described herein (e.g., B1-C7 described above).

In yet another aspect, some examples include a non-transitory computer-readable storage medium storing one or more programs for execution by one or more processors of a storage device, the one or more programs including instructions for performing any of the methods described herein (e.g., B1-B7 described above).

The present disclosure relates to systems and methods for generating an interpolated image according to at least the examples provided in the sections below:

(C1) In accordance with examples of the present disclosure, a method of generating an interpolated image is described. The method may include obtaining first multiscale features associated with image features extracted from a first image; obtaining second multi-scale features associated with image features extracted from a second image; warping the first multi-scale features using a first plurality of parameters obtained from an adaptive collaboration of flow model; warping the second multi-scale features using a second plurality of parameters obtained from the adaptive collaboration of flow model; and generating a candidate intermediate frame based on the warped first multi-scale features and the warped second multi-scale features.

(C2) In accordance with at least one example of C1, the method includes blending the candidate intermediate frame with a second candidate intermediate frame.

(C3) In accordance with at least one example of at least one of C1-C2, the second candidate intermediate frame is generated based on the first plurality of parameters and the second plurality of parameters.

(C4) In accordance with at least one example of at least one of C1-C3, the method includes using a 1×1 convolution to filter multi-scale encoded features and obtain the first multi-scale features associated with the image features extracted from the first image.

(C5) In accordance with at least one example of at least one of C1-C4, the method includes extracting the multi-scale features at different spatial dimensions and at different levels of an encoder.

(C6) In accordance with at least one example of at least one of C1-C5, the first image and the second image are adjacent to one another.

In yet another aspect, some examples include a computing system including one or more processors and memory coupled to the one or more processors, the memory storing one or more programs configured to be executed by the one or more processors, the one or more programs including instructions for performing any of the methods described herein (e.g., C1-C6 described above).

In yet another aspect, some examples include a non-transitory computer-readable storage medium storing one or more programs for execution by one or more processors of a storage device, the one or more programs including instructions for performing any of the methods described herein (e.g., C1-C6 described above).

Any of the one or more above aspects in combination with any other of the one or more aspect. Any of the one or more aspects as described herein.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A convolutional neural network configured to generate an interpolated image based on a first image and a second image, the convolutional neural network including:
   a first network including an encoder and a decoder, the first network configured to:
   extract first features from the first image, and
   extract second features from the second image;
   a feature pyramid configured to:
   extract multi-scale features from encoded first features, and
   extract multi-scale features from encoded second features; and
   a synthesis network configured to:
   warp the first features from the first image using a first plurality of parameters,
   warp the multi-scale features extracted from the encoded first features using the first plurality of parameters,
   warp the second features from the second image using a second plurality of parameters,
   warp the multi-scale features extracted from the encoded second features using the second plurality of parameters,
   generate a first candidate intermediate frame based on the warped first features and the warped second features,
   generate a second candidate intermediate frame based on the warped multi-scale features extracted from the encoded first features and the warped multi-scale features extracted from the encoded second features, and
   blend the first candidate intermediate frame and the second candidate intermediate frame to generate an interpolated frame.

2. The convolutional neural network of claim 1, wherein the feature pyramid is further configured to use a 1×1 convolution to filter the encoded first features and the encoded second features and extract the multi-scale features from the encoded first features and the encoded second features.

3. The convolutional neural network of claim 2, wherein the extracted multi-scale features are obtained at different spatial dimensions and at different levels of the encoder.

4. The convolutional neural network of claim 1, wherein the second image is an interpolated image.

5. The convolutional neural network of claim 1, wherein the first image and the second image are adjacent frames in a video sequence.

6. The convolutional neural network of claim 1, wherein the synthesis network is configured to:
   generate the first candidate intermediate frame based on the warped first features and the warped second features using a first learned occlusion mask; and
   blend the first candidate intermediate frame and the second candidate intermediate frame using a second learned occlusion mask.

7. The convolutional neural network of claim 1, wherein the convolutional neural network is generated based on a sparse solution obtained for another convolutional neural network.

8. A method of generating an interpolated image, the method comprising:
   receiving a first image and a second image at a neural network;
   extracting image features from the first image and warping the image features from the first image using a first plurality of parameters;
   extracting image features from the second image and warping the image features from the second image using a second plurality of parameters;

generating a first candidate intermediate frame based on the warped first features and the warped second features;
obtaining first multi-scale features associated with the image features extracted from the first image and warping the first multi-scale features using the first plurality of parameters;
obtaining second multi-scale features associated with the image features extracted from the second image and warping the second multi-scale features using the second plurality of parameters;
generating a second candidate intermediate frame based on the warped first multi-scale features and the warped second multi-scale features; and
blending the first candidate intermedia frame with the second candidate intermediate frame to generate the interpolated image.

9. The method of claim 8, further comprising:
using a 1×1 convolution to filter multi-scale encoded features and obtaining the first multi-scale features associated with the image features extracted from the first image; and
using the 1×1 convolution to filter multi-scale encoded features and obtaining the second multi-scale features associated with the image features extracted from the second image.

10. The method of claim 9, wherein the first multi-scale features are obtained at different spatial dimensions and at different levels of an encoder.

11. The method of claim 8, wherein the second image is an interpolated image.

12. The method of claim 8, wherein the first image and the second image are adjacent frames in a video sequence.

13. The method of claim 8, further comprising:
generating the first candidate intermediate frame based on the warped first features and the warped second features using a first learned occlusion mask; and
blending the first candidate intermediate frame and the second candidate intermediate frame using a second learned occlusion mask, wherein the first learned occlusion mask is different from the second learned occlusion mask.

14. The method of claim 8, further comprising generating the neural network based on a sparse solution obtained for another neural network.

15. A system comprising:
a processor; and
memory including instructions, which when executed by the processor, causes the processor to:
obtain first features from a first image;
obtain first multi-scale features from encoded first features;
obtain second features from a second image;
obtain second multi-scale features from encoded second features;
warp the first features from the first image using a first plurality of parameters,
warp the first multi-scale features using the first plurality of parameters;
warp the second features from the second image using a second plurality of parameters,
warp the second multi-scale features using the second plurality of parameters;
generate a first candidate intermediate frame based on the warped first features and the warped second features;
generate a second candidate intermediate frame based on the warped first multi-scale features and the warped second multi-scale features; and
blend the first candidate intermediate frame and the second candidate intermediate frame to generate an interpolated frame.

16. The system of claim 15, wherein the instructions, when executed by the processor, cause the processor to use a 1×1 convolution to obtain multi-scale encoded features and obtaining the first multi-scale features associated with the image features extracted from the first image.

17. The system of claim 15, wherein the instructions, when executed by the processor, cause the processor to extract the multi-scale features at different spatial dimensions and at different levels of an encoder.

18. The system of claim 15, wherein the first image and the second image are adjacent to one another.

* * * * *